United States Patent
Ru et al.

(10) Patent No.: US 12,302,105 B2
(45) Date of Patent: May 13, 2025

(54) SECURITY INFORMATION DISCOVERY METHOD, SECURITY INFORMATION CONFIGURATION METHOD, AND DEVICE

(71) Applicant: GUANGDONG OPPO MOBILE TELECOMMUNICATIONS CORP., LTD., Guangdong (CN)

(72) Inventors: Zhao Ru, Guangdong (CN); Xiaoqiang Lyu, Guangdong (CN); Jun Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 159 days.

(21) Appl. No.: 17/812,914

(22) Filed: Jul. 15, 2022

(65) Prior Publication Data
US 2022/0353239 A1 Nov. 3, 2022

Related U.S. Application Data

(63) Continuation of application No. PCT/CN2020/072866, filed on Jan. 17, 2020.

(51) Int. Cl.
*H04L 12/08* (2006.01)
*H04L 9/40* (2022.01)
*H04W 12/086* (2021.01)

(52) U.S. Cl.
CPC ....... *H04W 12/086* (2021.01); *H04L 63/0209* (2013.01); *H04L 63/0236* (2013.01)

(58) Field of Classification Search
CPC . H04L 12/185; H04L 63/065; H04L 63/0209; H04L 63/0236
See application file for complete search history.

(56) References Cited

U.S. PATENT DOCUMENTS

2012/0327933 A1* 12/2012 Retana .................. H04L 45/02
370/390
2017/0289943 A1* 10/2017 Zhao ..................... H04W 4/08
(Continued)

FOREIGN PATENT DOCUMENTS

CN 102739665 A 10/2012
CN 103152361 A 6/2013
(Continued)

OTHER PUBLICATIONS

Ma, Zhiyong "Method of Secure Domain Creation for Multiple Points in Home Networking" (Telecommunications Science), No. 11, Nov. 20, 2015 (Nov. 20, 2015). 6 pages.
(Continued)

*Primary Examiner* — Dao Q Ho
(74) *Attorney, Agent, or Firm* — PERKINS COIE LLP

(57) ABSTRACT

Provided is a method for discovering security information. A first device sends a broadcast or multicast message to M second devices in a network where the first device is located, M is an integer greater than or equal to 1, and the broadcast or multicast message contains a request for performing security domain discovery; the first device receives representations of security domain resources fed back by N second devices, wherein N is an integer greater than or equal to 1 and less than or equal to M; the first device obtains L pieces of security domain information on the basis of the representations of the security domain resources fed back by the N second devices, and displays the L pieces of security domain information, L is an integer greater than or equal to 1, and the security domain information comprises a security domain identification (ID) and a security domain name.

13 Claims, 17 Drawing Sheets

(56) References Cited

U.S. PATENT DOCUMENTS

| | | | | |
|---|---|---|---|---|
| 2017/0302562 A1* | 10/2017 | Lin | ............... | H04L 45/08 |
| 2018/0063695 A1* | 3/2018 | Kim | ............... | H04W 4/80 |
| 2020/0267527 A1* | 8/2020 | Gupta | ............ | H04L 41/0869 |
| 2022/0353239 A1* | 11/2022 | Ru | ............ | H04W 40/246 |

FOREIGN PATENT DOCUMENTS

| | | | |
|---|---|---|---|
| CN | 105577623 A | 5/2016 |
| CN | 107113703 A | 8/2017 |
| CN | 107153565 A | 9/2017 |
| CN | 109981725 A | 7/2019 |
| CN | 110113175 A | 8/2019 |
| JP | 2008500607 A | 1/2008 |
| JP | 2016525804 A | 8/2016 |
| JP | 2017518697 A | 7/2017 |

OTHER PUBLICATIONS

International Search Report in the international application No. PCT/CN2020/072866, mailed on Oct. 12, 2020. 5 pages.

Written Opinion of the International Search Authority in the international application No. PCT/CN2020/072866, mailed on Oct. 12, 2020. 10 pages.

Choo H G et al: "Proposal for New Domain Protocol Messages", The Digital Media Project, May 14, 2007. 14 pages.

The Digital Media Project: "Interoperable Digital Rights Management Platform Technical Specification, version 3.3" Oct. 23, 2010. 246 pages.

OCF: "OCF Security Specification VERSION 2.0.1" Feb. 11, 2019, XP009529902. 267 pages.

Supplementary European Search Report in the European application No. 20914630.7, mailed on Nov. 3, 2022. 9 pages.

First Office Action of the Indian application No. 202227046157, issued on Nov. 14, 2022. 6 pages with English translation.

Second Office Action of the European application No. 20914630.7, issued on Jan. 26, 2024, 5 pages.

First Office Action of the Chinese application No. 202211472013.X, issued on Apr. 13, 2024, 20 pages with English translation.

Notice of Rejection of the Japanese application No. 2022-543396, issued on Apr. 19, 2024, 2 pages with English translation.

First Office Action of the European application No. 20914630.7, issued on Jul. 18, 2023. 4 pages.

First Office Action of the Japanese application No. 2022-543396, issued on Sep. 29, 2023. 8 pages with English translation.

First Office Action of the Korean application No. 10-2022-7026539, issued on Aug. 23, 2024, 7 pages with English translation.

Hearing Notice of the Indian application No. 202227046157, issued on Aug. 30, 2024, 3 pages with English translation.

Notice of Rejection of the Indian application No. 202227046157, issued on Sep. 25, 2024, 1 page.

* cited by examiner

SECURITY INFORMATION DISCOVERY METHOD, SECURITY INFORMATION CONFIGURATION METHOD, AND DEVICE

CROSS REFERENCE TO RELATED APPLICATIONS

This is a continuation of International Application No. PCT/CN2020/072866, filed on Jan. 17, 2020, and entitled "SECURITY INFORMATION DISCOVERY METHOD, SECURITY INFORMATION CONFIGURATION METHOD, AND DEVICE", the disclosure of which is hereby incorporated by reference in its entirety.

TECHNICAL FIELD

The present disclosure relates to the field of information processing technologies, and in particularly to a method for discovering security information, a method and device for configuring security information, a chip, a computer-readable storage medium, a computer program product, and a computer program.

RELATED ART

In the related art, when a device of a user enters and accesses a home network, it may discover a master device and other devices (such as controlled devices or Internet of Things (IoT) devices in the home network) in the network. Further, through comparing relevant information of security domains of two devices, the device of the user determines that the other devices are configured by the master device. The device of the user then requests the master device to configure the device of the user, so as to enter the home network. As can be seen, a newly joined device needs to perform a plurality of device interactions for discovering a security domain in the network, and if there are a plurality of security domains in the same network, it is difficult to distinguish the security domains, which will affect the efficiency of the new device joining the home network.

DETAILED DESCRIPTION

For making the characteristics and technical contents of the embodiments of the present disclosure understood in more detail, implementation of the embodiments of the present disclosure will be described below in combination with the drawings in detail. The drawings are only adopted for description as references and not intended to limit the embodiments of the present disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1A:
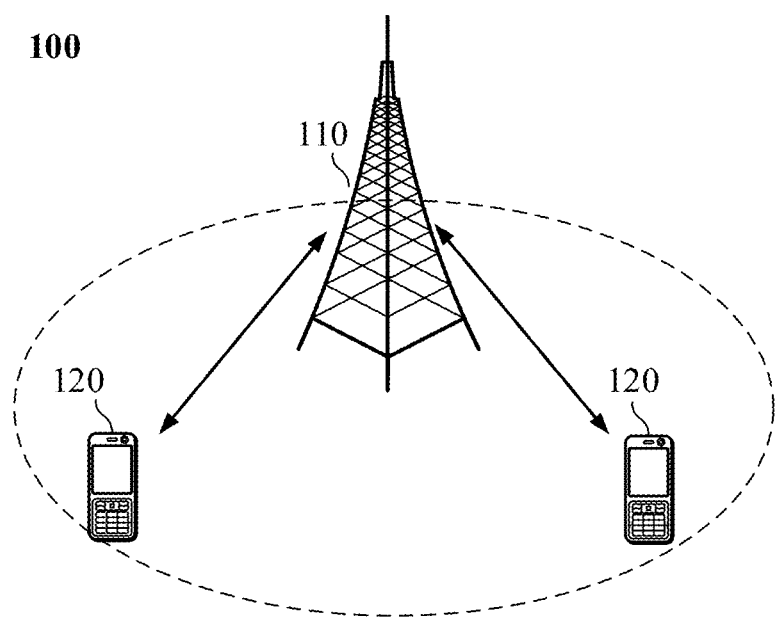
FIG. 1A is a schematic diagram of architecture of a communication system according to an embodiment of the present disclosure.

Exemplarily, a communication system 100 to which the embodiment of the present disclosure is applied may be illustrated in FIG. 1A. The communication system 100 may include a network device 110, which may be a device that communicates with a User Equipment (UE) 120 (or referred to as a communication terminal device, a terminal device). The network device 110 may provide communication coverage for a particular geographic area and may communicate with UEs located within the coverage area. Alternatively, the network device 110 may be a network device (Base Transceiver Station, BTS) in a GSM system or a CDMA system, may be a network device (NodeB, NB) in a WCDMA system, may be an evolutional network device (Evolutional Node B, eNB or eNodeB) in an LTE system, or may be a radio controller in a Cloud Radio Access Network (CRAN), or may be a mobile switching center, a relay station, an access point, a vehicle-mounted device, a wearable device, a hub, a switch, a bridge, a router, a network-side device in a 5G network, a network device in a future evolved Public Land Mobile Network (PLMN), or the like In the related art of the Internet of Things, a device needs to be activated before operating in a network or interacting with other devices. The first step for activating the device is to configure ownership of the device. A legal user establishes the ownership of the device by Owner Transfer Methods (OTMs) with the OBT. After the ownership is established, the device is configured with the OBT, and finally the device can operate normally and interact with other devices. For example, referring to FIG. 1B, the first step for activating the device may include the following operations.

1) An OBT discovers a device to be configured in the network.

2) The device to be configured returns an owner transfer method supported by the device.

3) The OBT establishes a secure connection with the device to be configured according to the selected owner transfer method.

4) The OBT configures its own ID to a property "deviceowneruuid" of "/oic/sec/doxm" of the device, and creates the owner identity of the device.

5) The OBT checks types of security credentials supported by the device to be configured, such as a symmetric key, an asymmetric key, a certificate, etc.

6) The OBT selects an appropriate symmetric security credential.

7) The OBT configures the selected symmetric security credential to the resource "/oic/sec/cred" of the device.

8) The OBT assigns the device to be configured to a Credential Management Service (CMS), which is typically a part of the OBT. Considering the expandability and modular design, the CMS may also be deployed as a service separately.

9) The OBT configures its own ID to a property "rowneruuid" of "/oic/sec/doxm" of the device, and sets the owner of the /doxm resource.

10) The OBT configures its own ID (ID of the CMS) to the property "rowneruuid" of "/oic/sec/cred" of the device, and sets the owner of the resource "/oic/sec/cred".

11) The OBT configures the credential for establishing a secure connection with the CMS to the resource "/oic/sec/cred" of the device.

12) The OBT/CMS changes the state of the device to the service configuration state.

13) The OBT/CMS configures the credential for establishing a secure connection of a local area network with other devices to the resource "/oic/sec/cred" of the device.

14) The OBT/CMS changes the state of the device to a normal operating state.

The structure of the resource "/oic/sec/doxm" is:

```
{
    "oxms": [ 0, 2, 3 ],    //supported OTM modes
    "oxmsel": 0,    //selected OTM mode
    "sct": 16,  //supported credential type
    "owned": true,     //identify whether the owner of the device is created
```

-continued

```
    "deviceuuid":   "de305d54-75b4-431b-adb2-eb6b9e  546014,"
//device ID
    "devowneruuid":    "e61c3e6b-9c54-4b81-8ce5-f9039c1d04d9,"
//ID of the owner of the device
    "rowneruuid":       "e61c3e6b-9c54-4b81-8ce5-f9039c1d04d9"
//ID of the owner of the resource
}
```

The OBT is the owner of the network, and may configure the client device(s) and the server device in the network to communicate with each other. After configuration, the OBT is the owner of the configured device. For example, FIG. 1C shows a scenario applied in a home.

(1) Mom installs a client application (APP), such as a client APP installed on the mobile phone of the Mom as shown in the figure.

(2) Mom creates a home and various user roles such as admin, family, guest, etc.

(3) Mom discovers and configures an IoT device DR-Bulb.

(4) Mom may control DR-Bulb.

(5) Dad installs a client APP, such as a client APP installed in the mobile phone of Dad as shown in the figure.

(6) The APP of Mom discovers the APP of Dad, configures the APP of Dad, and grants an authority "family" to the APP of Dad, so that the Dad may also control DR-Bulb.

(7) Mom may also grants an authority "admin" to Dad, so that Dad may also configure and manage DR-Bulb.

(8) A new device, such as LR-Bulb, may be configured in the same manner as DR-Bulb.

(9) For a new client APP, its role and authority may be configured in the same manner as that of Dad.

In the above step 5, after Dad installs the APP, the APP is launched and connected to the home network, and the APP of Mom and DR-Bulb in the network can be discovered. Further, the APP of Dad obtains the deviceuuid and the devowneruuid in the resources "doxm" of the APP of Mom and of DR-Bulb respectively. By comparison, it is concluded that for the APP of the Mom, the deviceuuid and the devowneruuid in the doxm resource are the same, and thus the APP of Mom is OBT. For DR-Bulb, the deviceuuid and the devowneruuid in the doxm resource are different, and thus the DR-Bulb is a client device or a server device. Meanwhile, if the devowneruuid of DR-Bulb and the deviceuuid of the APP of Mom are the same, it is considered that the DR-Bulb is configured by the APP of Mom. Then, the APP of Dad may request the APP of Mom to configure the APP of Dad to access the home network, and the process proceeds to the step 6.

If the APP of Dad also desires to be an OBT to configure new devices to enter the home network, the APP of Mom may configure the APP of the Dad as a slave OBT, and the APP of Mom may serve as a master OBT. Thereafter, devices configured by Dad can also access the home network and communicate with DR-Bulb. In a security domain network, there is only one master OBT, and there may be a plurality of slave OBTs.

In the prior art, in order to discover a security domain in a network, device interaction needs to be performed for multiple times; moreover, when there are a plurality of security domains in the same network, especially when the security domain includes the master and slave OBTs, it is difficult to distinguish the security domains.

It should be understood that the terms "system" and "network" are used interchangeably herein. The term "and/ or" in the disclosure means only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

For making the characteristics and technical contents of the embodiments of the present disclosure understood in more detail, implementation of the embodiments of the present disclosure will be described below in combination with the drawings in detail. The drawings are only adopted for description as references and not intended to limit the embodiments of the present disclosure.

Figure 2:
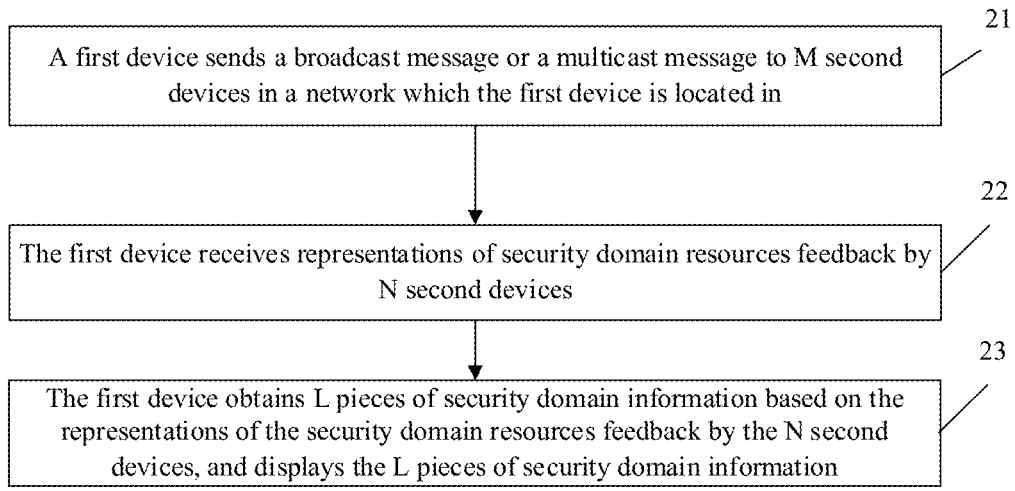
FIG. 2 is a first schematic flowchart of a method for discovering security information according to an embodiment of the present disclosure.

An embodiment of the present disclosure provides a method for discovering security information, as shown in FIG. 2, the method includes the following operations.

At operation 21, the first device sends a broadcast message or a multicast message to M second devices in a network which the first device is located in, where M is an integer greater than or equal to 1, and the broadcast message or the multicast message includes a request for performing security domain discovery.

At operation 22, the first device receives representations of security domain resources fed back by N second devices, where N is an integer greater than or equal to 1 and less than or equal to M.

At operation 23, the first device obtains L pieces of security domain information based on the representations of the security domain resources fed back by the N second devices, and displays the L pieces of security domain information, where L is an integer greater than or equal to 1, and each piece of the security domain information includes a security domain ID and a security domain name.

Figure 3:
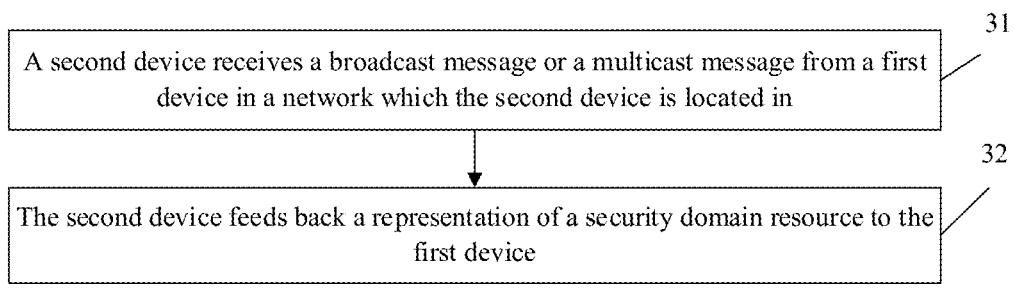
FIG. 3 is a second schematic flowchart of a method for discovering security information according to an embodiment of the present disclosure.

An embodiment of the present disclosure further provides a method for discovering security information, as shown in FIG. 3, the method includes the following operations.

At operation 31, the second device receives a broadcast message or a multicast message from a first device in a network which the second device is located in, where the broadcast message or the multicast message includes a request for performing security domain discovery.

At operation 32, the second device feeds back a representation of a security domain resource to the first device, where the representation of the security domain resource includes security domain information, and the security domain information includes a security domain ID and a security domain name.

Figure 4:
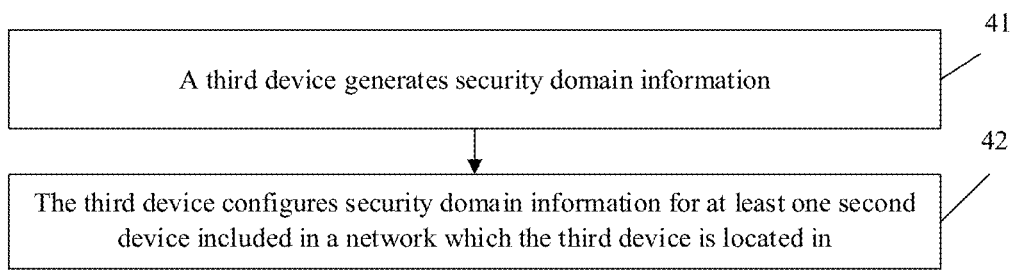
FIG. 4 is a flowchart of a method for configuring security information according to an embodiment of the present disclosure.

An embodiment of the present disclosure provides a method for configuring security information, as shown in FIG. 4, the method includes the following operations.

At operation 41, a third device generates security domain information, where the security domain information includes at least a security domain ID and a security domain name.

At operation 42, the third device configures security domain information for at least one second device included in a network which the third device is located in.

The first device or the third device described above may be a terminal device on which a client APP is installed, for example, may be a device such as a smartphone, a tablet computer, or the like. The second device may be any controlled device, or an IoT device, etc. in the Internet of Things or the home network. It should also be noted that the first device, the third device, and the second device are devices in the same network environment.

The solution according to the embodiment will now be described in conjunction with various examples.

In one example,
the security domain information only includes a security domain ID and a security domain name. In other words, in the example, the discoverability of the security domain is not limited, or it is understood that all the second devices of Internet of Things in the same network are discoverable devices.

Figure 5:
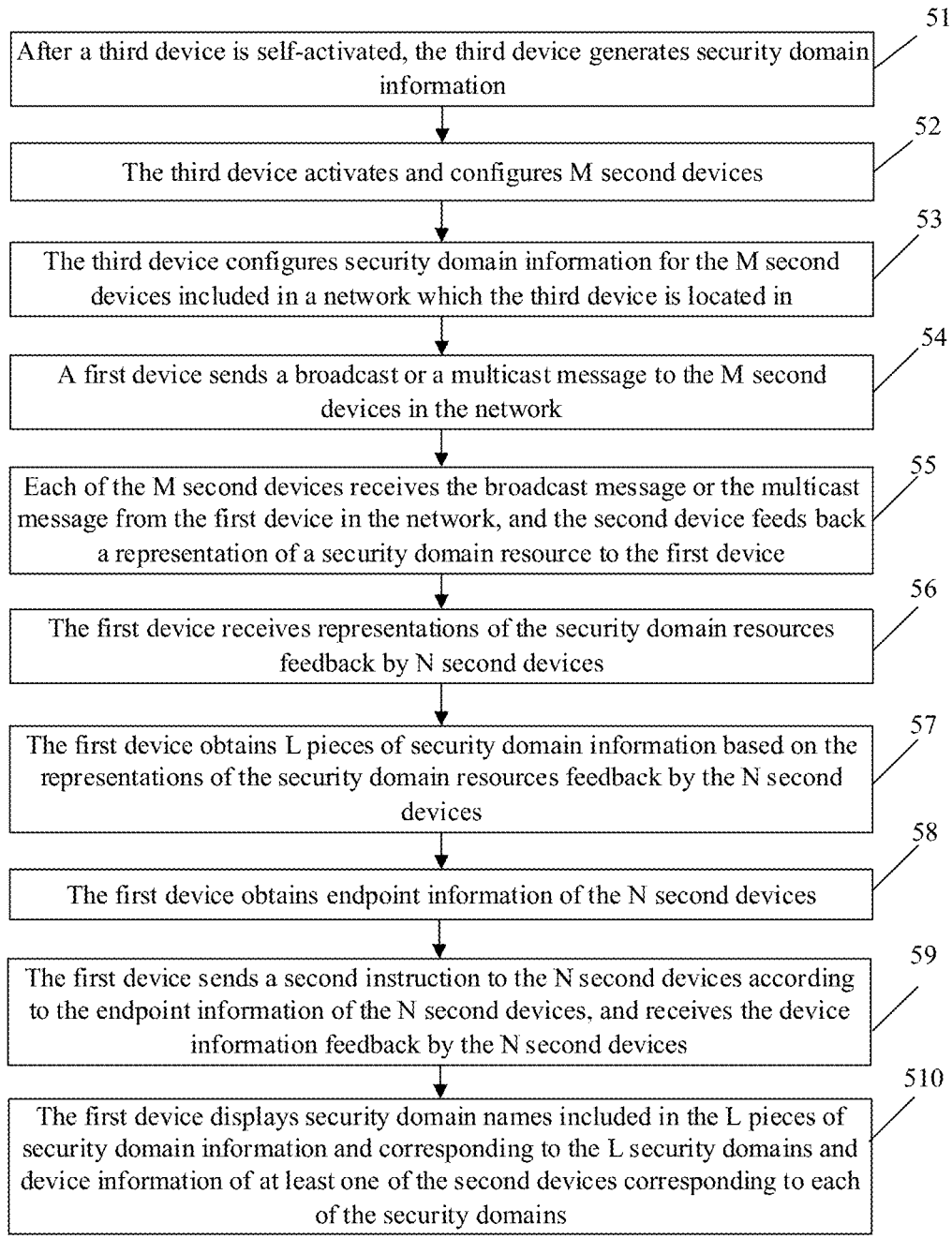
FIG. 5 is a first flowchart of a system processing flow according to an embodiment of the present disclosure.

In at least one embodiment, as shown in FIG. 5, the method may include the following operations.

At operation 51, after a third device is self-activated, the third device generates security domain information. In the example, the security domain information includes a security domain ID and a security domain name.

The manner of generating the security domain ID may be as follows: the third device generates a hash value according to its own root CA certificate, and uses the value as the security domain ID.

The security domain name may be generated automatically.

Alternatively, the manner of generating the security domain name may be as follows: after generating the security domain ID, the third device may generate and display a prompt message. The prompt message is used to request the user to set a security domain name. The third device obtains the security domain name after receiving the setting of the user.

Further, the representation of the resource "secDomain" of a security domain of the third device (i.e., the above-mentioned OBT) may be as follows:

```
{
    "sdid" = e61c3e6b-9c54-4b81-8ce5-f9039c1d04d9,
    "sdn" = my home,
}.
```

In the example, the third device may be a device of Mom (such as a mobile phone). In at least one embodiment, a client APP may be installed on the third device, and the third device may perform processing such as configuration through the client APP as follows.

A security domain resource may be added to the third device to configure and manage the security domain to which the device belongs.

A representation of a security domain resource may include description of a corresponding Uniform Resource Identifier (URI), resource type title, resource type ID, interface, and related functions, as shown in Table 1.

TABLE 1

| URI | Resource type title | Resource type ID ("rt" value) | Interface | Description |
| --- | --- | --- | --- | --- |
| /oic/sec/secDomain | SecurityDomain | oic.r.secDomain | baseline | configure a security domain resource |

The property representation of the security domain resource may include a security domain ID and a security domain name, as shown in Table 2 below.

TABLE 2

| Property title | Property name | Value type | Value rule | Access mode | Description |
| --- | --- | --- | --- | --- | --- |
| Security domain ID | sdid | string | uuid | RW | universal unique identifier of the security domain, accessible via multicast |
| Security domain name | sdn | string | — | RW | name of the security domain |

At operation 52, there are M second devices, or referred to as controllable devices, in the network which the third device is located in. The third device activates and configures the M second devices (for example, controllable devices or IoT devices), where M is an integer greater than or equal to 1.

Figure 1B:
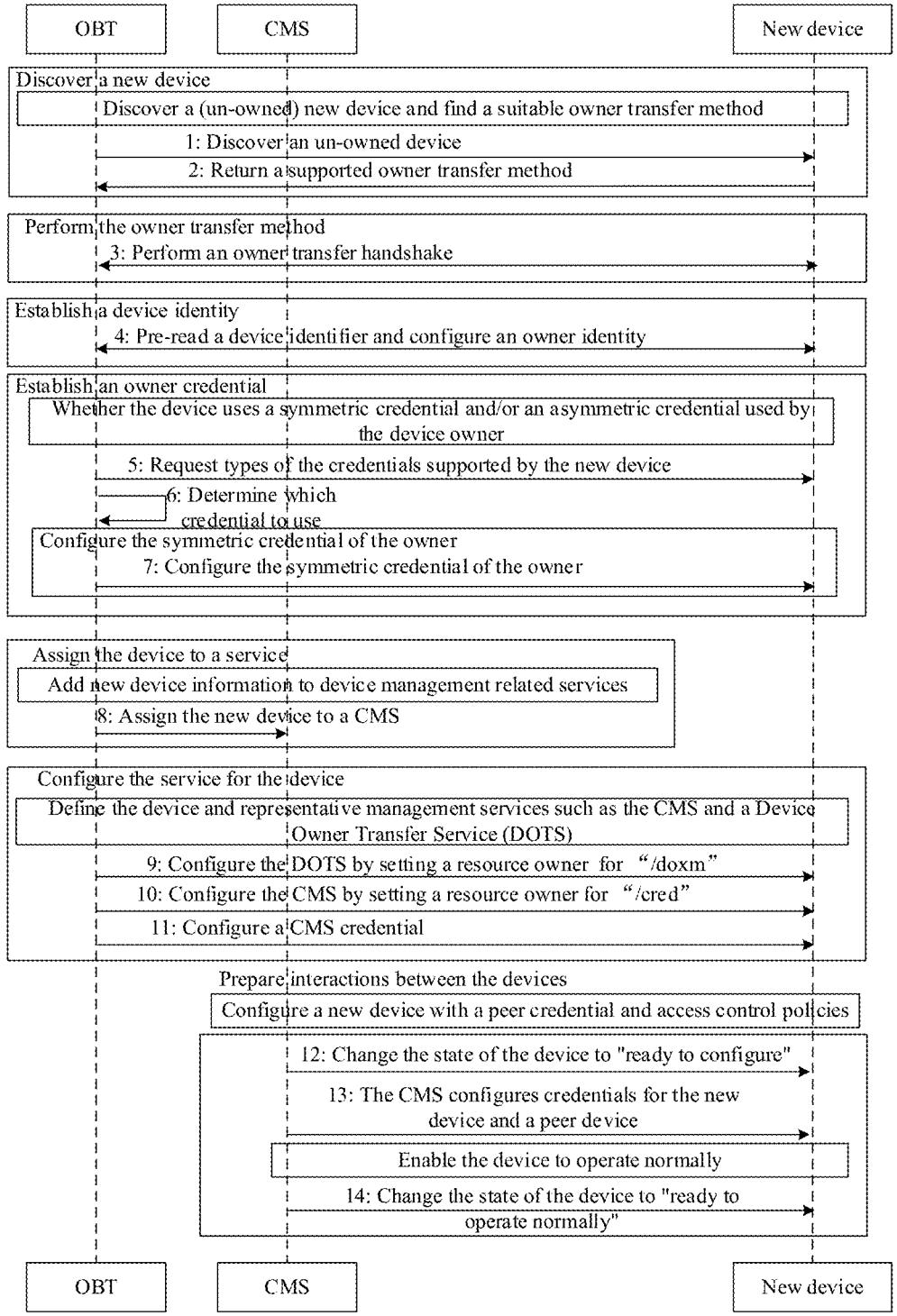
FIG. 1B is a flowchart of a method for configuring and activating other devices by an Onboarding Tool (OBT).
Figure 1C:
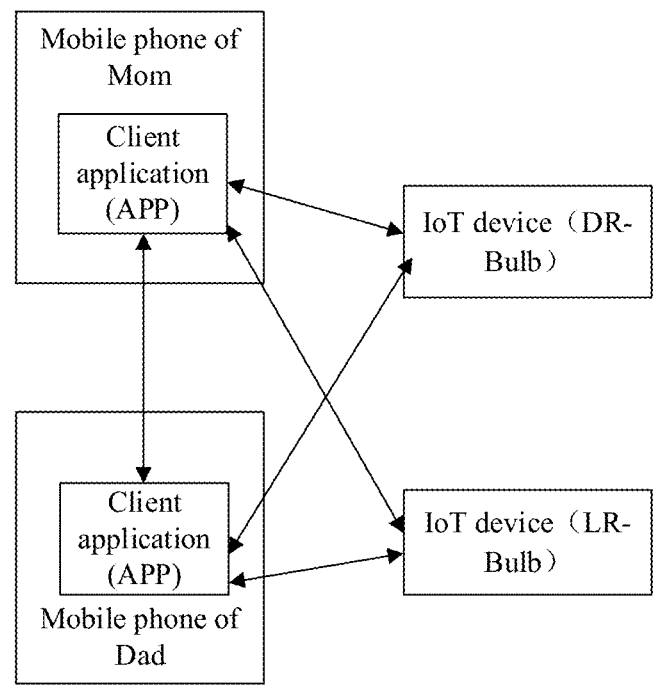
FIG. 1C is a schematic structural diagram of architecture of an OBT and other devices.

The manner of activating and configuring the at least one second device may be as the manner shown in FIG. 1B, and details are not described herein again.

At operation 53, the third device obtains security domain information configured by itself from the representation of the security domain resource (resource "secDomain"), and configures security domain information for the M second devices included in the network.

The manner in which the third device configures the M second devices may be sending a third instruction to the second device, and configuring the security domain ID and the security domain name to the M second devices.

```
UPDATE /oic/sec/secDomain
{
   "sdid" = e61c3e6b-9c54-4b81-8ce5-f9039c1d04d9,
   "sdn" = my home,
}.
```

Correspondingly, any one of the M second devices receives a third instruction from the third device in the network which the second device is located in. The third device is capable of configuring the security domain resource. The third instruction includes security domain information.

Then, the M second devices configure their own security domain information based on the received third instruction to obtain representations of security domain resources.

Thus, the configurations for the security domain information of the M controllable devices or the M second devices included in the network which the third device is located in are completed.

At operation 54, the first device enters the network, and sends a broadcast or a multicast message to the M second devices in the network. M is an integer greater than or equal to 1. The broadcast message or the multicast message includes a request for performing security domain discovery.

The broadcast message or the multicast message, which may be "RETRIEVE/oic/sec/secDomain" is used for performing security domain discovery.

At operation 55, each of the M second devices receives the broadcast message or the multicast message from the first device in the network, and the second device feeds back a representation of a security domain resource to the first device.

The representation of the security domain resource includes security domain information, and the security domain information includes a security domain ID and a security domain name.

The broadcast message or the multicast message includes a request for performing security domain discovery.

At operation 56, the first device receives representations of the security domain resources (i.e., resource representations) fed back by N second devices.

In the example, N=M, that is, since the security domain discoverability is not limited in the security domain information set in the example, they are all discoverable devices. Therefore, in at least one embodiment, the operation includes that the first device receives the representations of the security domain resources fed back by the M second devices.

At operation 57, the first device obtains L pieces of security domain information based on the representations of the security domain resources fed back by the N second devices. In the example, the first device obtains at least one piece of security domain information based on the representations of the security resources fed back by the N (may also be M in the example) second devices. L may be 1. As such, L security domain names included in the current network may be displayed at the first device side.

Further, the method may further include the following operations.

At operation 58, the first device obtains endpoint information of the N second devices.

A specific manner of obtaining the endpoint information may include the following operations.

The first device sends a first instruction to the N second devices, and receives endpoint information fed back by the N second devices. The first instruction is used to obtain endpoint information of the second devices. Correspondingly, the second device receives the first instruction from the first device, and feeds back endpoint information to the first device. The first instruction is used to obtain endpoint information of the second device.

Alternatively, the manner of obtaining the endpoint information may include the following operations.

The first device obtains endpoint information of the N second devices from the network side.

The first device may send a first instruction to the N second devices respectively, to obtain endpoint information. The specific instruction may be "RETRIEVE/res?rt=secDomain".

In the example, the endpoint information includes at least one of:

an IP address of the second device or a port number of the second device.

At operation 59, the first device sends a second instruction to the N second devices according to the endpoint information of the N second devices, and receives the device information fed back by the N second devices. The second instruction is used to obtain device information of the second devices.

Correspondingly, the second device receives a second instruction from the first device, and feeds back device information to the first device.

The second instruction may be "RETRIEVE/oic/d".

Further, the device information may include at least device information such as a device type, an ID, and the like.

Of course, the device information may include other content, which is not exhaustive in the example.

At operation 510, the first device displays security domain names included in the L pieces of security domain information corresponding to the L security domains and device information of at least one of the second devices corresponding to each of the security domains.

That is, the first device may obtain N pieces of security domain information according to the representations of security domain resources fed back by the N second devices; and extract L security domain IDs from N pieces of the security domain information. The L security domain IDs are all different from each other.

The security domain names corresponding to the L security domain IDs are displayed, and the corresponding device information under each of the L security domain names is displayed based on the device information fed back by the N second devices.

Further, the foregoing manner of determining the L security domain IDs may be extracting one security domain ID contained in the N security domain information, comparing the extracted security domain ID with the remaining security domain IDs to determine whether the security domain IDs are the same, and if the extracted security domain ID is the same as each of the remaining security domain identifiers, it is determined that one security domain ID is obtained through the N security domain identifiers. That is, one security domain exists in the network.

Alternatively, if the extracted security domain ID is different from one of the remaining security domain IDs, the different security domain IDs are placed in another set, and the currently extracted security domain ID is used as one of the L security domain IDs. Further, the above-mentioned processing is repeatedly performed in the another set until the obtained security domain IDs are different from each other.

Based on the foregoing operations, the user may also view L security domain names and at least one device information corresponding to each of the security domain names through a display interface (such as a display screen) of the first device.

The user may then select a target security domain to be joined through the interaction interface of the first device, so that the first device joins the selected target security domain.

For example, it is assumed that in the home network, the third device, that is, the mobile phone APP of Mom, which serves as an OBT, is first self-activated and configures itself, which may include configuring security domain information for itself. A plurality of Internet of Things devices may be included in the home network, such as three second devices, referred to as Device1, Device2, and Device3, respectively. The third device, which serves as an OBT, then configures each of the three devices, and set security domain information. At this time, the OBT and the Device1, the Device2 and the Device3 form a security domain network in the home.

Thereafter, the first device (such as the device of Dad, or the mobile phone APP of Dad) discovers and enters the home network by using the client APP installed on the first device. The first device may act as a client in the network, discovers a controllable device (that is, the second device) through a client APP installed on the first device, and finds a security domain corresponding to the controllable device (that is, the second device).

Figure 6A:
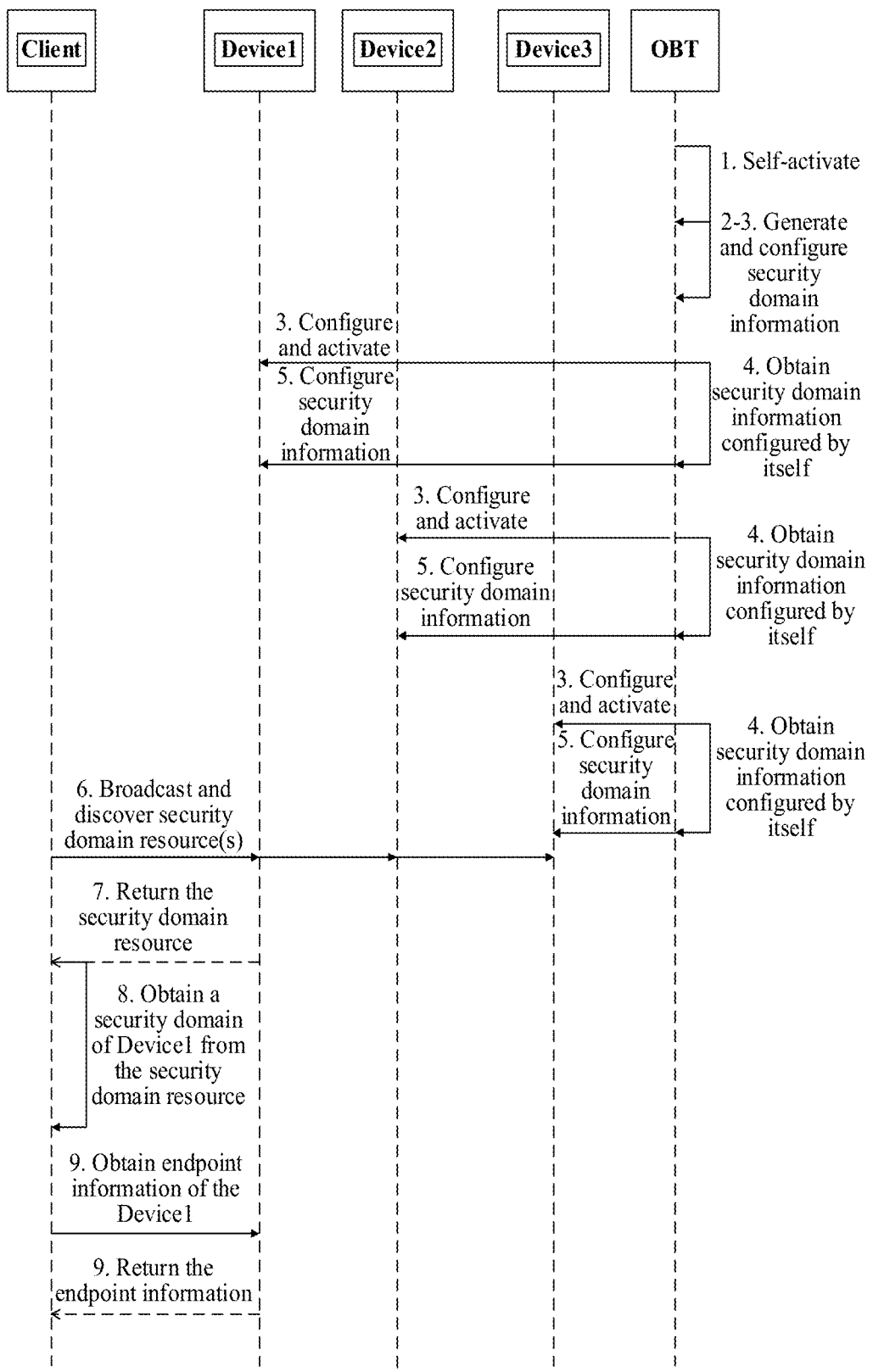
FIGS. 6A and 6B are a second flowchart of a system processing flow according to an embodiment of the present disclosure.
Figure 6B:
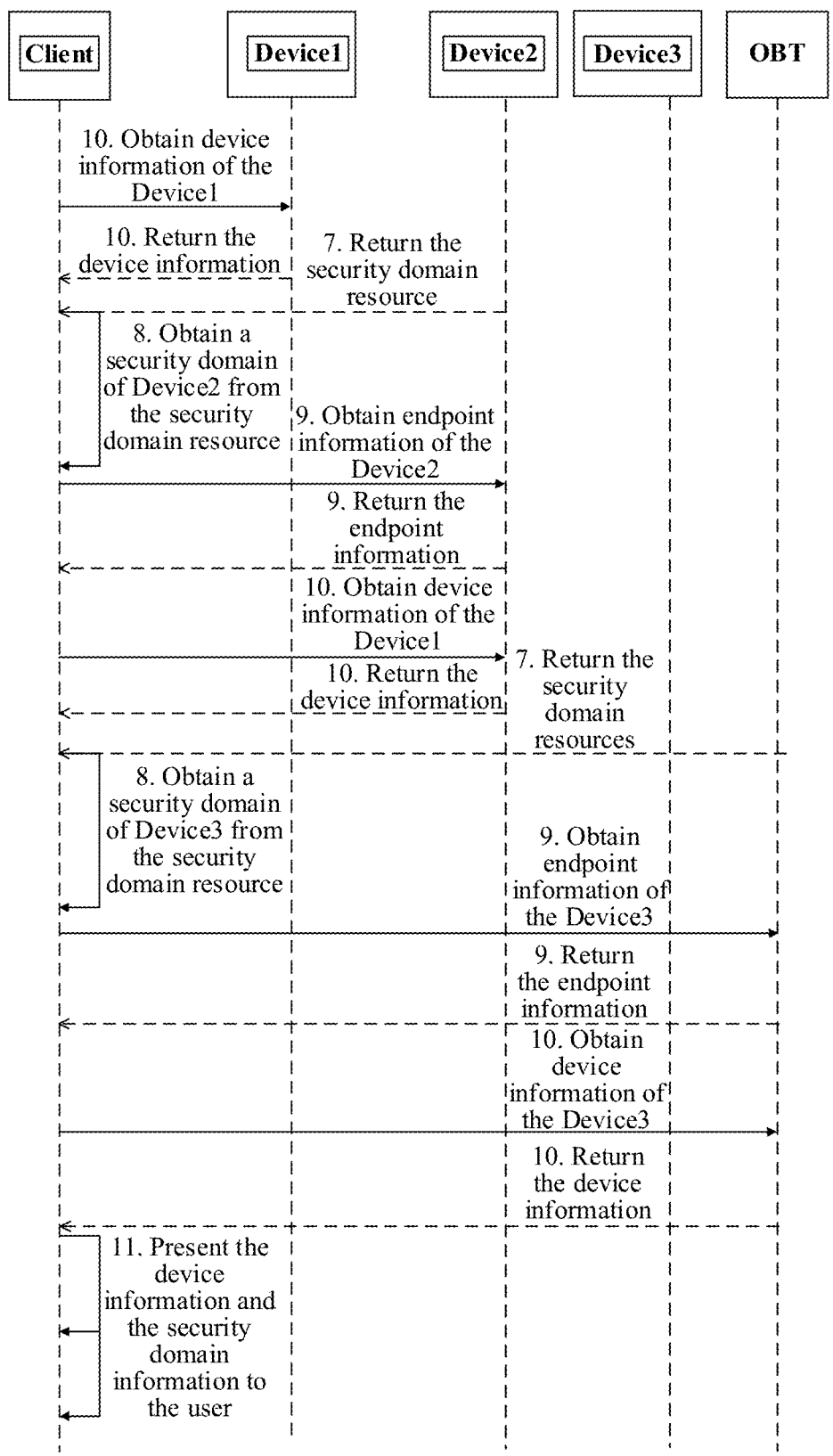

As an example, the third device (the mobile phone of Mom) is taken as the OBT, the network which third device is located in is the home network, the network includes 3 second devices, namely Device1, Device2, and Device3, and the first device is the client APP of Dad. The embodiment is illustrated with reference to FIGS. 6A and 6B, and the specific operations are as follows.

Self-Activation of the OBT

The OBT generates a hash value according to its own root CA certificate, and uses the value as the security domain ID. After that, the OBT requests the user to set a security domain name and whether the security domain name is discoverable. After the setting, the form of a resource "secDomain" of the OBT is:

```
{
    "sdid" = e61c3e6b-9c54-4b81-8ce5-f9039c1d04d9,
    "sdn" = my home,
}
```

There are three devices, i.e., Device1, Device2 and Device3 in the network, and the OBT activates and configures the three devices respectively according to the above-mentioned method.

The OBT obtains security domain information configured by itself from the resource "secDomain" (i.e., the representation of the security domain resource).

The OBT configures the security domain information of Device1, Device2, and Device3, and sends the following third instruction to the devices:

```
UPDATE /oic/sec/secDomain
{
    "sdid" = e61c3e6b-9c54-4b81-8ce5-f9039c1d04d9,
    "sdn" = my home,
}
```

The uuid and the name of the security domain are set in the devices Device1, Device2, and Device3.

The client APP of Dad enters the network and sends a broadcast/multicast message to other devices in the network: RETRIEVE/oic/sec/secDomain; to perform security domain discovery.

After receiving the request message, Device1, Device2 and Device3 return the resources "secDomain" (representations of the security domain resources) to the client APP of Dad.

The client of Dad is able to obtain their security domain information from the resources "secDomain" (representations of the security domain resources) returned by Device1, Device2 and Device3.

In at least one embodiment, the client of Dad further sends a first instruction "RETRIEVE/res?rt=secDomain" to Device1, Device2 and Device3 to obtain their respective endpoint information, and obtains the IP addresses and port numbers of the devices. Alternatively, the client of Dad obtains endpoint information of the response messages of Device1, Device2, and Device3 from the network layer.

The client of Dad sends a second instruction "RETRIEVE/oic/d" to Device1, Device2, and Device3 to obtain their respective device information according to the obtained endpoint information, and obtains the device information such as the types and the IDs of the devices.

Figure 7:
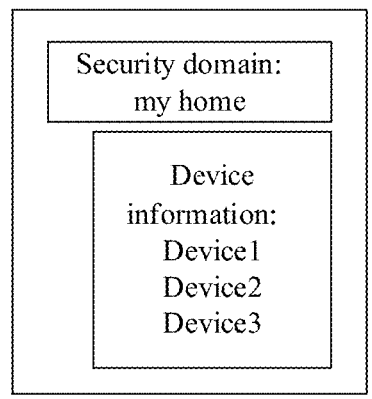
FIG. 7 is a first schematic diagram displaying a security domain according to an embodiment of the present disclosure.

The client of Dad presents the obtained network security domain information and the device information of each device in the security domain to the user Dad (as shown in FIG. 7), and Dad may choose to add the client of Dad to the security domain according to the requirement of device interaction.

In still another example, different from the foregoing example, the security domain information in the example further includes security domain discoverability.

The security domain discoverability is used to indicate whether the security domain information corresponding to the second device can be discovered by other devices. In particular, it may be a value of 1 bit, for example, when the security domain discoverability is set to a first value, it indicates that the security domain discoverability is not discoverable, that is, the security domain discoverability is true; and when the security domain discoverability is set to a second value, it indicates that the security domain discoverability is discoverable, that is, the security domain discoverability is false. The first value may be 1 and the second value may be 0. Alternatively, the first value is 0 and the second value is 1. Of course, the security domain discoverability may also be set in other ways, which is not exhaustive in the example, as long as the security domain discoverability can be indicated as true or false.

That is, a security domain resource is added to the device to configure and manage the security domain to which the device belongs, as shown in Table 3.

TABLE 3

| URI | Resource type title | Resource type ID ("rt" value) | Interface | Description |
| --- | --- | --- | --- | --- |
| /oic/sec/secDomain | SecurityDomain | oic.r.secDomain | baseline | configure a security domain resource |

The properties of the security domain resource are shown in Table 4, and may be expressed as follows:

TABLE 4

| Property title | Property name | Value type | Value rule | Access mode | Description |
| --- | --- | --- | --- | --- | --- |
| Security domain ID | sdid | string | uuid | RW | universal unique identifier of the security domain, accessible via multicast |
| Security domain name | sdn | string | — | RW | name of the security domain |
| Security domain discoverability | discoverable | bool | | RW | Is the security domain discoverable or not: true (discoverable) false (not discoverable) |

Figure 8:
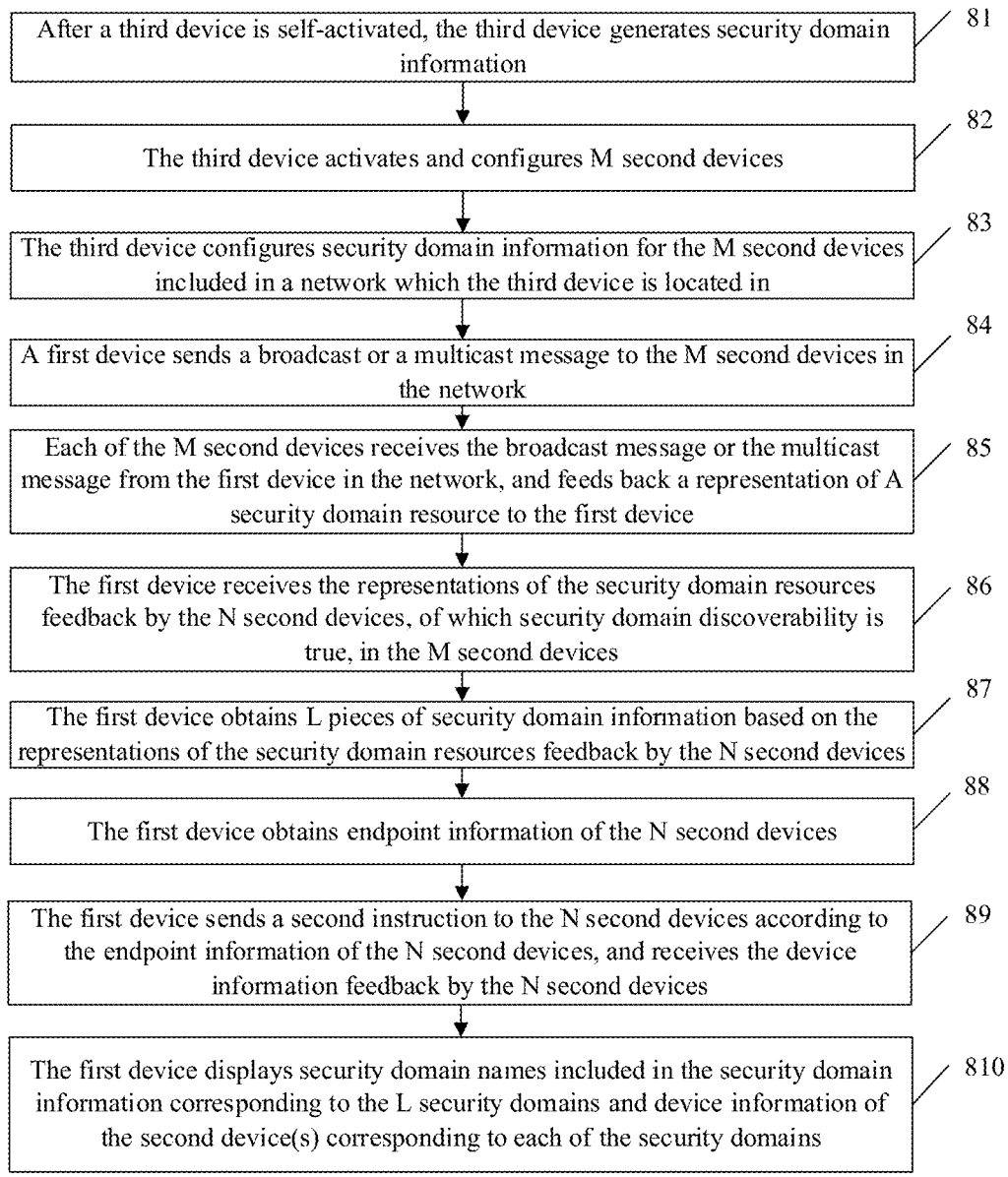
FIG. 8 is a third flowchart of a system processing flow according to an embodiment of the present disclosure.

In at least one embodiment, as shown in FIG. 8, the method may include the following operations.

At operation 81, after a third device is self-activated, the third device generates security domain information. In the example, the security domain information includes a security domain ID and a security domain name, and security domain discoverability.

The manner of generating the security domain ID may be as follows: the third device generates a hash value according to its own root CA certificate, and uses the value as the security domain ID.

The security domain name may be generated automatically.

Alternatively, the manner of generating the security domain name may be as follows: after generating the security domain ID, the third device may generate and display a prompt message. The prompt message is used to request the user to set a security domain name. The third device obtains the security domain name after receiving the setting of the user.

The security domain discoverability may be set according to user demands.

Further, the representation of the resource of a security domain secDomain of the third device (i.e., the above-mentioned OBT) may be as follows:

```
{
    "sdid" = e61c3e6b-9c54-4b81-8ce5-f9039c1d04d9,
    "sdn" = my home,
    "discoverable" = true
}.
```

The operation 82 is the same as the operation 52, and details are not described again.

At operation 83, the third device obtains security domain information configured by itself from the representation of the security domain resource (resource "secDomain"), and configures security domain information for the M second devices included in a network which the third device is located in.

The manner in which the third device configures the M second devices may be that the third device sends a third instruction to each of the second devices, and configures the security domain ID and the security domain name to the M second devices.

The difference from the operation 53 in the foregoing example is that the third device may set the security domain discoverability of the second device to be true or false according to the actual situation. That is, the content of the third instruction sent for different second devices may be different. For example, if the security domain discoverability of the second device is set to be true, then

```
UPDATE /oic/sec/secDomain
{
    "sdid" = e61c3e6b-9c54-4b81-8ce5-f9039c1d04d9,
    "sdn" = my home,
    "discoverable" = true
}.
```

If the security domain discoverability of the second device set to be false, then,

```
UPDATE /oic/sec/secDomain
{
    "sdid" = e61c3e6b-9c54-4b81-8ce5-f9039c1d04d9,
    "sdn" = my home,
    "discoverable" = false
}.
```

Correspondingly, any one of the M second devices receives a third instruction from the third device in the network which the second device is located in. The third device is capable of configuring the security domain resource. The third instruction includes security domain information.

Then, each of the M second devices configures its own security domain information based on the received third instruction to obtain a representation of the security domain resource.

Thus, the configurations for the security domain information of the M controllable devices or the M second devices included in the network which the third device is located in are completed.

The operation 84 is the same as the operation 54 in the foregoing example, and is not described again.

At operation 85, each of the M second devices receives a broadcast message or a multicast message from the first device in the network.

Then, each of the second devices determines whether the security domain discoverability in the representation of the security domain resource saved by itself is true.

The second device feeds back the representation of the security domain resource in response to that the security domain discoverability is true; otherwise, the second device does not feed back the representation of the security domain resource.

The broadcast message or the multicast message includes a request for performing security domain discovery.

At operation 86, the first device receives the representations of the security domain resources fed back by the N second devices, of which security domain discoverability is true, in the M second devices.

In the example, N may be equal to M, or N may be less than M.

At operation 87, the first device obtains L pieces of security domain information based on the representations of the security domain resources fed back by the N second devices. In the example, the first device obtains at least one piece of security domain information based on the representations of the security resources fed back by the N second devices. L may be 1. As such, the first device side may display L security domain names included in the current network.

Further,
the operations 88 to 810 are the same as the operations 58 to 510 in the foregoing example, and details are not described herein again.

Figure 9A:
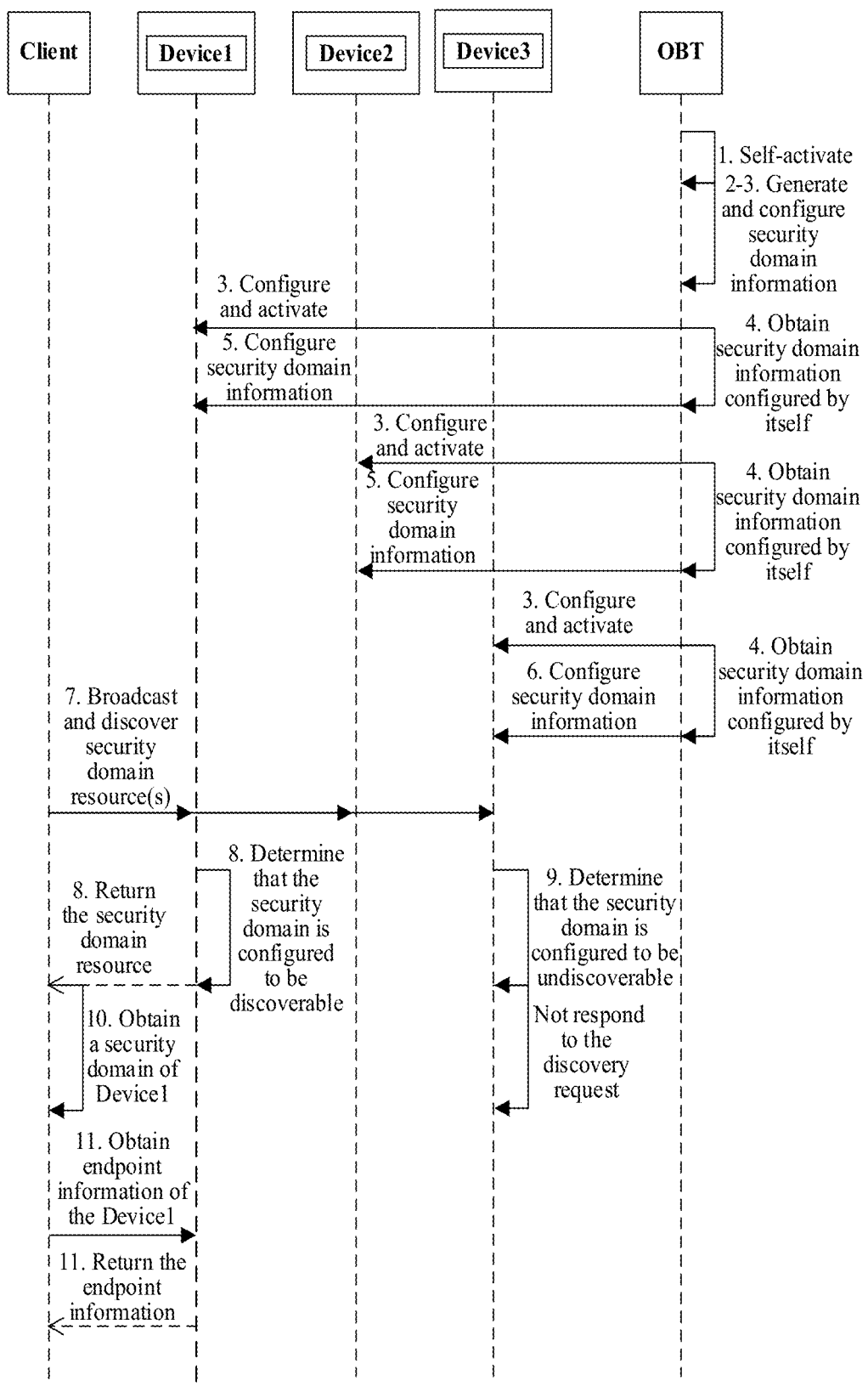
FIGS. 9A and 9B are a fourth flowchart of a system processing flow according to an embodiment of the present disclosure.
Figure 9B:
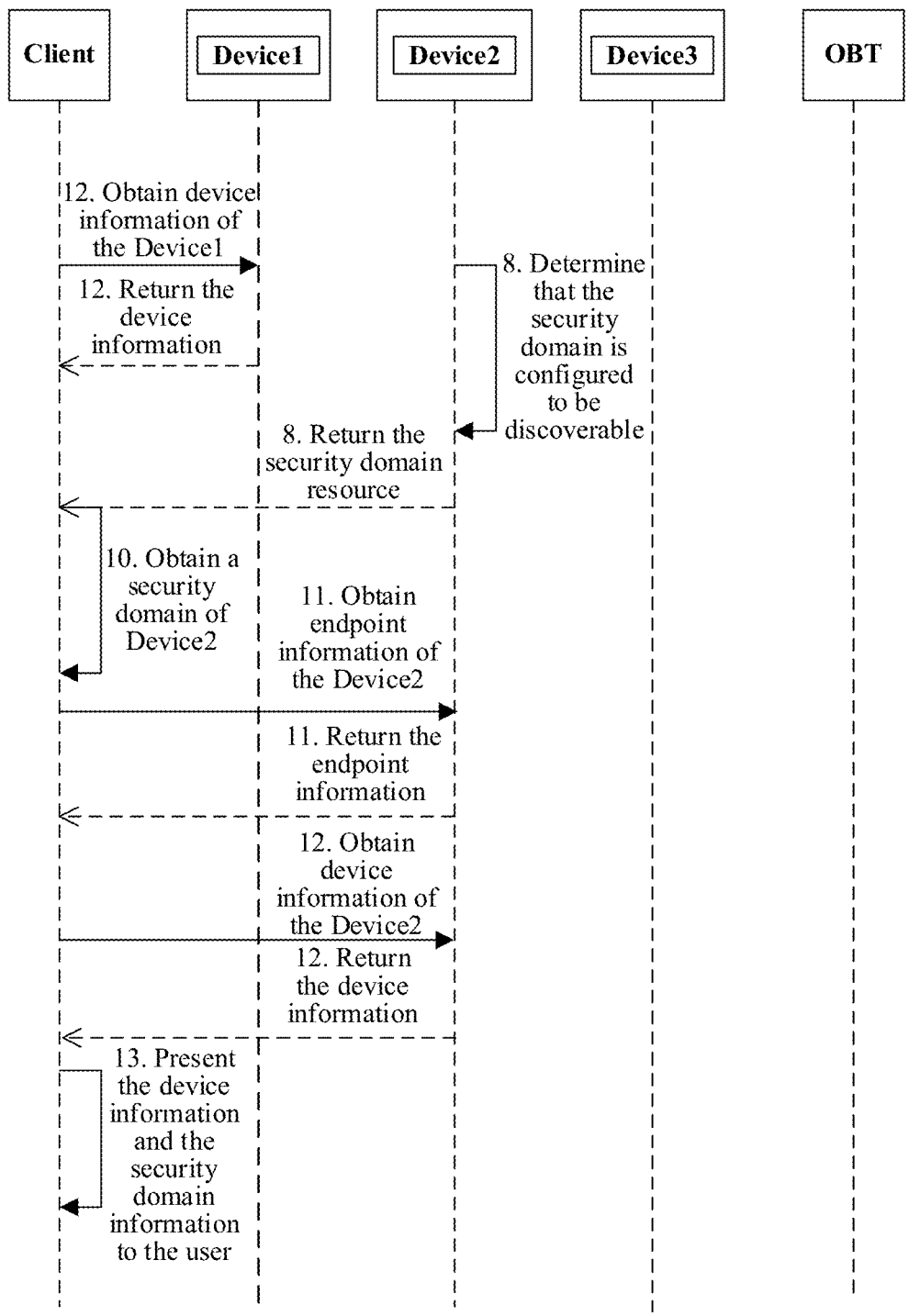

For example, it is assumed that in the home network, the mobile phone APP of Mom (i.e., the third device), which serves as the OBT, is first self-activated and configures itself. The network has three second devices, referred to as Device1, Device2 and Device3, respectively. The OBT configures the three devices and sets security domain information. At this time, the OBT and the Device1, the Device2 and the Device3 form a security domain network in the home. The mobile phone APP of the Dad (i.e., the first device) then enters the home network. As a client, the mobile phone APP of Dad discovers the controllable device and finds the corresponding security domain. As shown in FIGS. 9A and 9B, the general flow includes the following specific operations.

Self-Activation of the OBT

The OBT generates a hash value according to its own root CA certificate, and uses the value as the security domain ID. After that, the OBT requests the user to set a security domain name and whether the security domain name is discoverable. After the setting, the form of a resource "secDomain" of the OBT is:

```
{
    "sdid" = e61c3e6b-9c54-4b81-8ce5-f9039c1d04d9,
    "sdn" = my home,
    "discoverable" = true
}
```

There are devices Device1, Device2 and Device3 in the network, and the OBT activates and configures three devices according to the above-mentioned method respectively.

The OBT obtains security domain information configured by itself from the resource "secDomain".

The OBT configures the security domain information of the Device1 and the Device2, and sends the following instructions to the device:

```
UPDATE /oic/sec/secDomain
{
    "sdid" = e61c3e6b-9c54-4b81-8ce5-f9039c1d04d9,
    "sdn" = my home,
    "discoverable" = true
}
```

The uuid, the name and the discoverability of the security domain are set in the device.

The OBT configures security domain information of the Device3, and sends the following instructions to the device:

```
UPDATE /oic/sec/secDomain
{
    "sdid" = e61c3e6b-9c54-4b81-8ce5-f9039c1d04d9,
    "sdn" = my home,
    "discoverable" = false
}
```

The uuid, the name and the discoverability of the security domain are set in the device.

The client APP of Dad enters the network, sends a broadcast/multicast message "RETRIEVE/oic/sec/secDomain" to other devices in the network, and performs security domain discovery.

After receiving the request message, the Device1 and the Device2 determine that the value of the property "discoverable" is true, and return the resource "secDomain" to the client.

After receiving the request message, the Device3 determines that the value of the property "discoverable" is false, and does not respond to the request of the client.

The client of Dad is able to obtain their security domain information from the resources "secDomain" returned by the Device1 and the Device2. Since the Device3 does not return the resource "secDomain", the client of Dad cannot obtain the security domain information of the Device3.

In at least one embodiment, the client of Dad further sends a first instruction "RETRIEVE/res?rt=secDomain" to the Device1 and the Device2 to obtain their respective endpoint information, and obtains the IP addresses and port numbers of the devices. Alternatively, the client obtains endpoint information of the response messages of Device1 and Device2 from the network layer.

The client sends a second instruction "RETRIEVE/oic/d" to the Device1 and the Device2 according to the obtained endpoint information, to obtain their respective device information, and obtains device information such as the types and the IDs of the devices.

Figure 10:
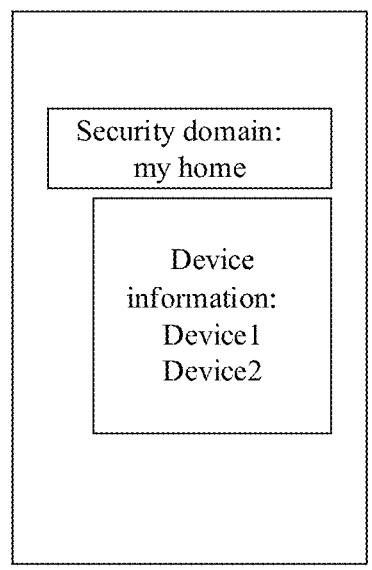
FIG. 10 is a second schematic diagram displaying a security domain according to an embodiment of the present disclosure.

The client presents the obtained network security domain information and the device information of each device in the security domain to the user Dad (as shown in FIG. 10), and the Dad may choose to add the client to the security domain according to the requirement of device interaction.

In the last example, different from the foregoing example, there may be two or more third devices in the example, each of the third devices may set its own security domain, and different third devices may set the same security domain or different security domains.

Accordingly, if the security domains of the third devices are different, the each of the third devices may set corresponding security domain information (including the security domain ID, the security domain name, and the security domain discoverability) for some of the M second devices to which the third device is connected.

After the first device accesses the network, the first device may obtain M security domain resources from the M second devices respectively, then determine and display the L security domains, and finally determine the security domains to be joined. In the example, L may be greater than or equal to 2.

Figure 11:
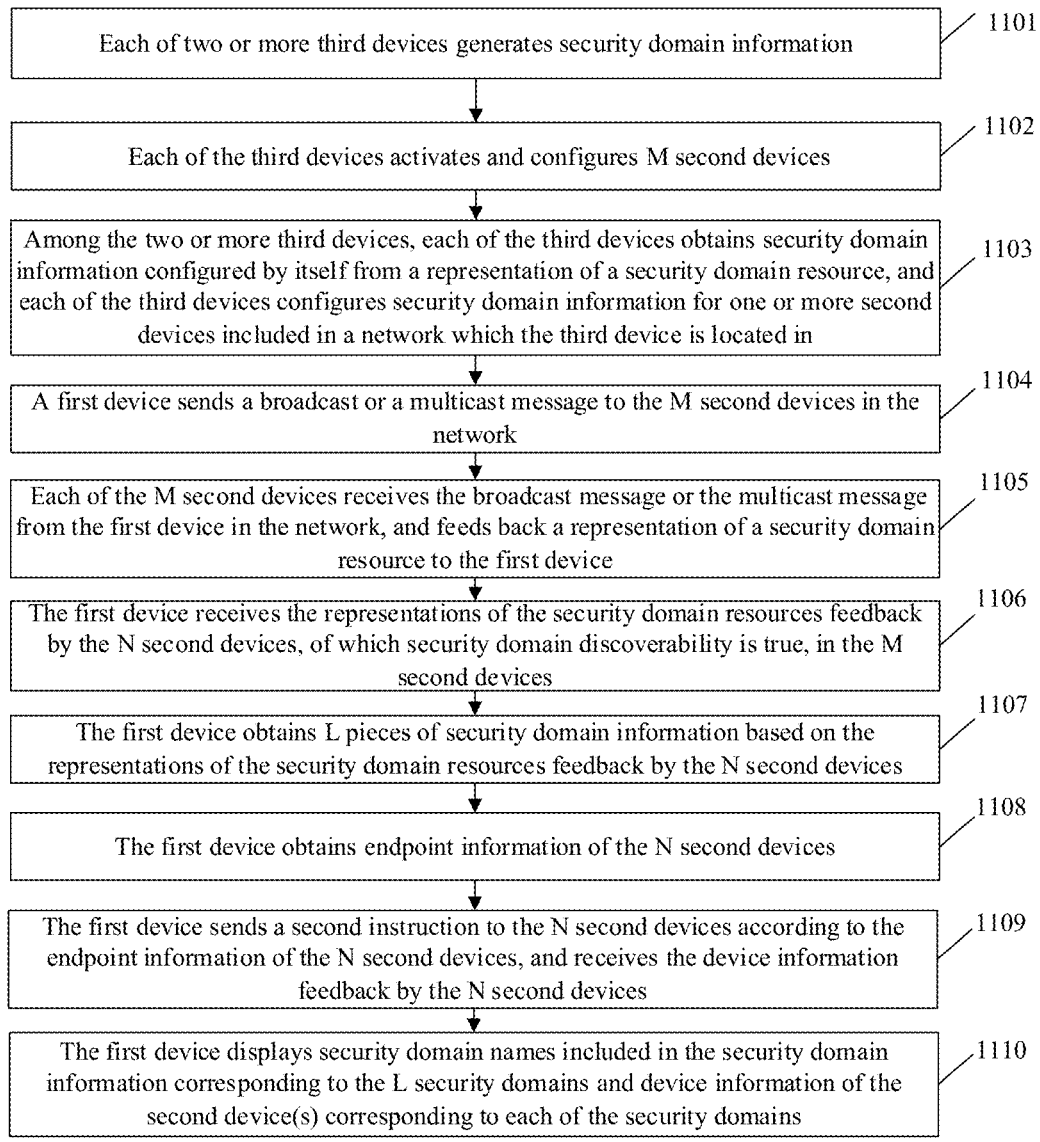
FIG. 11 is a fifth flowchart of a system processing flow according to an embodiment of the present disclosure.

The example is described in detail below with reference to FIG. 11.

At 1101, each of two or more third devices generates security domain information.

In at least one embodiment, each of the third devices executes the foregoing operation 81, and the order of different third devices executing the operation 81 may not be limited. That is, any one of the third devices may execute the operation 81 first, and finally the third devices generate their respective security domain information. In the example, the security domain information includes a security domain ID, a security domain name, and security domain discoverability.

Details are not described herein.

At 1102, then, each of the third devices activates and configures M second devices. The processing of each of the third devices is the same as operation 82, and details are not described again.

At 1103, among the two or more third devices, each of the third devices obtains security domain information configured by the third device itself from a representation of a security domain resource (resource "secDomain"), and each of the third devices configures security domain information for one or more second devices included in a network which the third device is located in.

The difference from the foregoing operation is that, in this operation, any of the second device(s) configured by a third device is different from the second device(s) configured by another third device. For example, the first third device configures the second devices 1, 2, then the second third device would not configure the second devices 1, 2, and may configure the second devices 3, 4, 5. No exhaustion is performed. In addition, there is no preset correspondences between the third devices and the second devices regarding configurations for the second devices, and a third device which is first connected to (or accesses) a second device taken as is the device for configuring the second device. For example, if the first third device is first connected to and configures the second device 1, then the second third device connected to the second device 1 would not (or cannot) configure the second device 1.

The third device may configure each second device in the same manner as the foregoing operation 83, and details are not described again.

Correspondingly, any one of the M second devices receives a third instruction from one of the third devices in the network which the M second devices are located in. The third device is capable of configuring the security domain resource. The third instruction includes security domain information. Then, the M second devices configure their own respective security domain information based on the received third instruction to obtain representations of security domain resources.

Thus, the configurations of the security domain information of the M controllable devices or the M second devices included in the network which the third device is located in are completed.

The operations 1104 to 1106 are the same as the operations 84 to 86 in the foregoing example, and are not described again.

At 1107, the first device obtains L pieces of security domain information based on the representations of the security domain resources fed back by the N second devices. In the example, the first device obtains at least one piece of security domain information based on the representations of the security resources fed back by the N second devices. L may be an integer greater than or equal to 2. As such, L security domain names included in the current network may be displayed at the first device side.

Further, the method may further include the following operations.

The operations 1108 to 1110 are the same as the operations 88 to 810 in the foregoing example, and are not described herein again.

The difference may be that the first device determines L security domains in the network which the first device is located in, according to security domain IDs included in the representations of the security domain resources fed back by the N second devices.

In at least one embodiment, the first device determines whether the security domain IDs included in the representations of the security domain resources fed back by any two second devices are the same, and if the security domain IDs are different, the security domain IDs are stored as different security domain IDs. In this way, the first device compares the security domain IDs to obtain L security domain IDs that are different from each other in the current network. The security domain names corresponding to the L security domain IDs are displayed. And device information of one or more second devices corresponding to each of the security domain names is displayed. L is equal to or greater than 2.

Further, the user selects a target security domain to be joined from the L security domain names currently displayed.

Still further, in the example, a security domain resource is added in the device to configure and manage the security domain to which the device belongs. The property representation of the security domain resource is the same as Table 3 and Table 4 in the foregoing examples, and details are not described again.

For example, it is assumed that in the home network, the mobile phone APP of Mom, which serves as an OBT 1 (that is, a third device, or a master OBT), first self-activates and configures itself. The mobile phone APP of Son, which serves as an OBT 2 (which may be understood as another third device, or referred to as a slave OBT), self-activates and configures itself. There are two second devices in the network, i.e., Device1 and Device2 respectively. The mobile phone APP of the Mom and the mobile phone APP of the Son configure the two devices respectively, and set the respective security domain information. In this case, the mobile phone APP (OBT1) of the Mom and the Device1 form a security domain networks in the home, the mobile phone APP (OBT2) of the Son and the Device2 form a security domain network in the home, the two security domain networks are independent of each other.

The mobile phone APP of Dad then enters the home network. As a client, the mobile phone APP of the Dad discovers the controllable devices and finds the corresponding security domains.

Figure 12A:
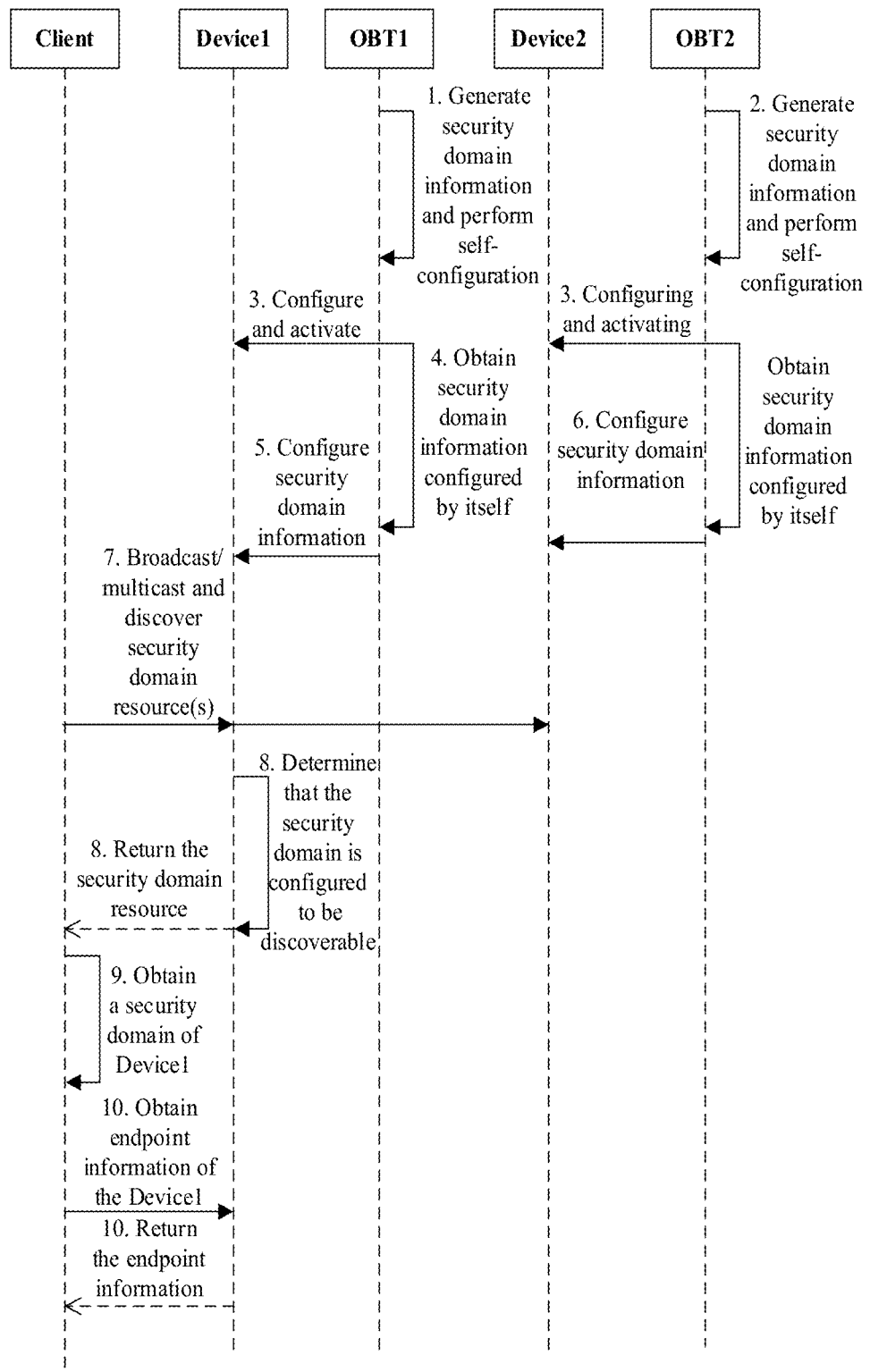
FIGS. 12A and 12B are a sixth flowchart of a system processing flow according to an embodiment of the present disclosure.
Figure 12B:
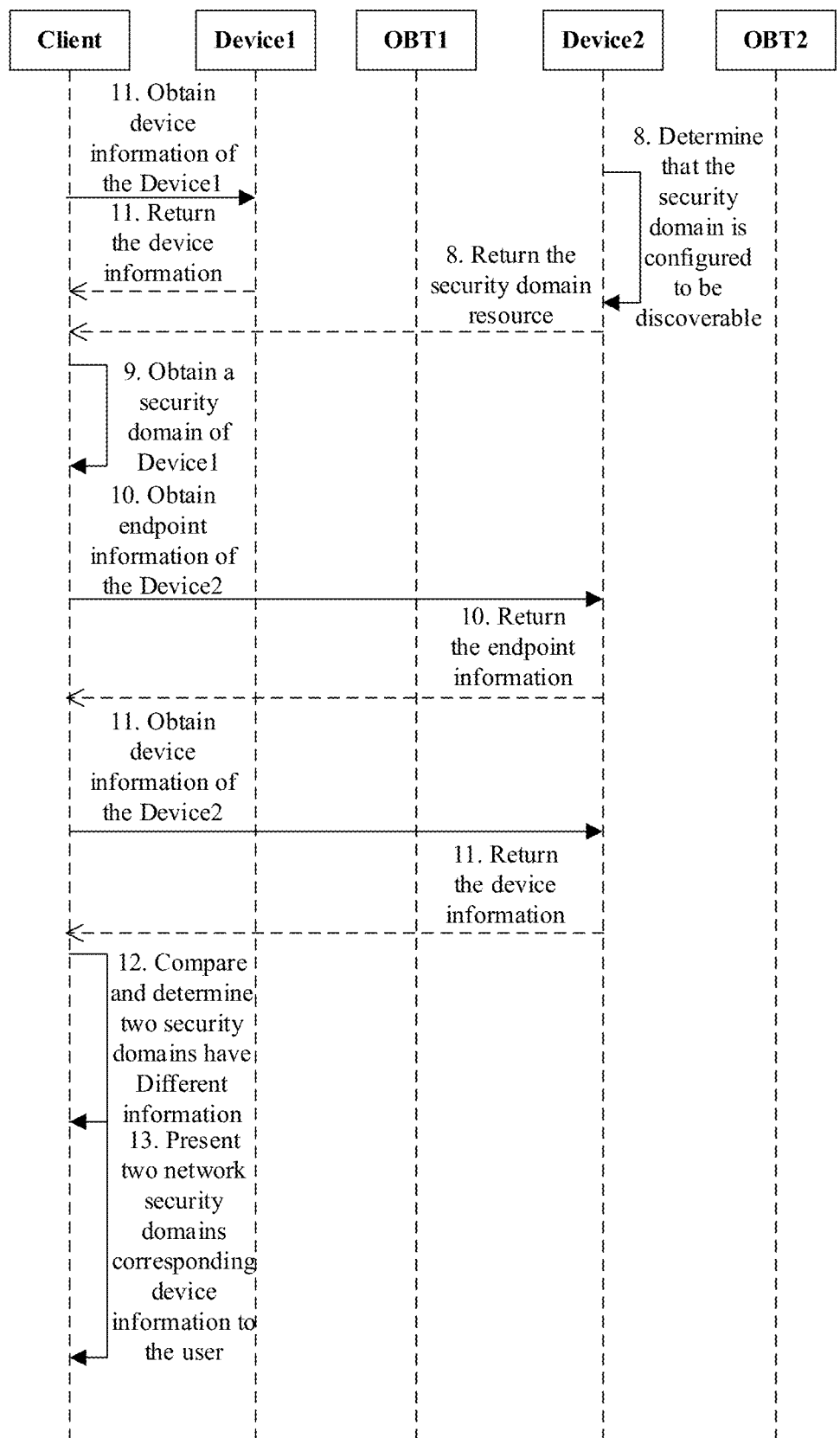

The example is described in detail below with reference to FIGS. 12A and 12B.

The mobile phone APP of the Mom is self-activated, generates a hash value according to its own root CA certificate, and uses the value as the security domain ID. After that, the mobile phone APP of the Mom requests the user to set a security domain name and the security domain name is discoverable. After the setting, the form of resource "secDomain" of the mobile phone APP of the Mom is:

```
{
    "sdid" = e61c3e6b-9c54-4b81-8ce5-f9039c1d04d9,
    "sdn" = my home,
    "discoverable" = true
}
```

The mobile phone APP of the Son is self-activated, generates a hash value according to its own root CA certificate, and uses the value as the security domain ID. After that, the mobile phone APP of the Son requests the user to set a security domain name and whether the security domain name is discoverable. After setting, the form of resource "secDomain" of the mobile phone APP of the Son is:

```
{
    "sdid" = 61c74915-6491-12d2-7934-1da81f1ce27d,
    "sdn" = my room,
    "discoverable" = true
}
```

There are devices Device1 and Device2 in the network, the mobile phone APP of the Mom and the mobile phone APP of the Son respectively activate and configure the two devices according to the method of FIG. 1B.

The mobile phone APP of the Mom obtains the security domain information configured by itself from the resource "secDomain".

The mobile phone APP of the Mom configures the security domain information of the Device1, and sends the third instruction to the device as follows:

```
UPDATE /oic/sec/secDomain
{
    "sdid" = e61c3e6b-9c54-4b81-8ce5-f9039c1d04d9,
    "sdn" = my home,
    "discoverable" = true
}
```

The uuid, the name and the discoverability of the security domain are set in the device.

The mobile phone APP of the Son configures the security domain information of the Device2, and sends the third instruction to the device as follows:

```
UPDATE /oic/sec/secDomain
{
    "sdid" = 61c74915-6491-12d2-7934-1da81f1ce27d,
    "sdn" = my room,
    "discoverable" = true
}
```

The uuid, the name and the discoverability of the security domain are set in the device.

The client APP of the Dad enters the network, sends the following broadcast/multicast message to other devices in the network:

RETRIEVE/oic/sec/secDomain?discoverable=true and performs security domain discovery.

After receiving the request message, the Device1 and the Device2 determine that the value of the property "discoverable" is true, and return the resource "secDomain" to the client.

The client of the Dad is able to obtain their security domain information from the resources "secDomain" returned by the Device1 and the Device2.

In at least one embodiment, the client of the Dad further sends an instruction "RETRIEVE/res?rt=secDomain" to the Device1 and the Device2 to obtain their respective endpoint information, and obtains the IP addresses and port numbers of the devices. Alternatively, the client obtains endpoint information of the response messages of the Device1 and Device2 from the network layer.

According to the obtained endpoint information, the client sends the following instruction to the Device1 and the Device2 to obtain their respective device information:

RETRIEVE/oic/d and obtains device information such as the types and the IDs of the devices.

The client compares whether the sdids of the two security domains are identical, and determines that the two security domains are different in response to the sdids of the two security domains being identical.

Figure 13:
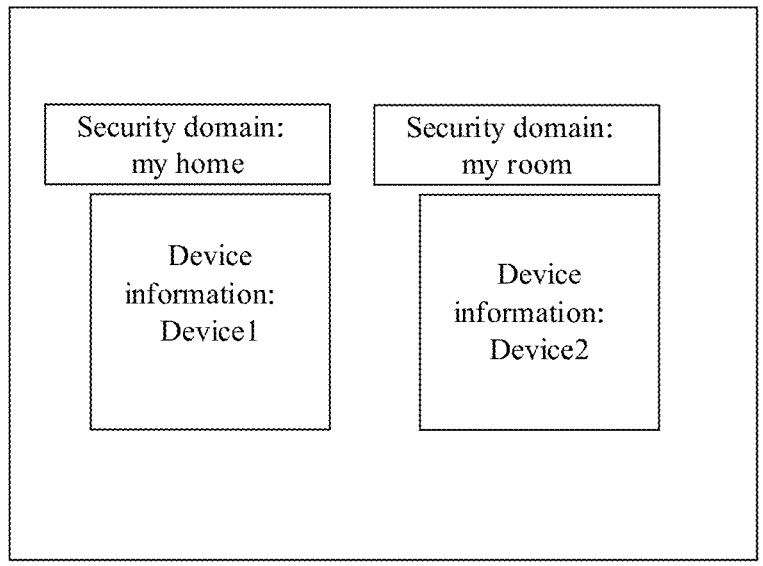
FIG. 13 is a third schematic diagram displaying a security domain according to an embodiment of the present disclosure.

The client presents the obtained network security domain information and the device information of each of the devices in the security domain to the user Dad, and Dad may choose to add the client to a security domain according to requirements of the device interaction. As shown in FIG. 13, names of the two security domains, i.e., my home and my room, and devices included in each of the security domains are displayed.

As can be seen, according to the above solution, when the first device enters the network, the first device can discover, through a broadcast/multicast request, representations of security domain resources fed back by the plurality of second devices. Therefore, the first device can conveniently discover and obtain the security domain information existing in the network after entering the network. Accordingly, the client can present the discovered security domain to the user.

Figure 14:
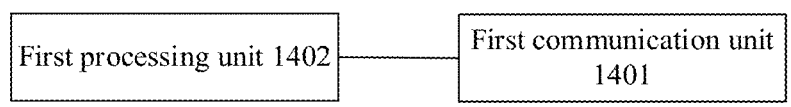
FIG. 14 is a schematic structural diagram of three devices according to embodiments of the present disclosure.

An embodiment of the present disclosure provides a first device, as shown in FIG. 14, the first device includes a first communication unit 1401 and a first processing unit 1402.

The first communication unit 1401 is configured to send a broadcast message or a multicast message to M second devices in a network which the first device is located in, where M is an integer greater than or equal to 1, and the broadcast message or the multicast message includes a request for performing security domain discovery; and receive representations of security domain resources fed back by N second devices, where N is an integer greater than or equal to 1 and less than or equal to M.

The first processing unit 1402 is configured to obtain L pieces of security domain information based on the representations of the security domain resources fed back by the N second devices, and display the L pieces of security domain information, where L is an integer greater than or equal to 1, and each piece of the security domain information includes a security domain ID and a security domain name.

Figure 15:
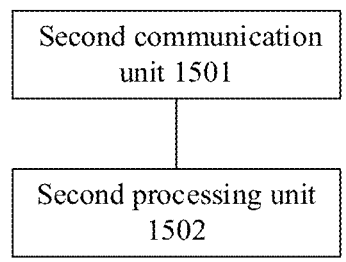
FIG. 15 is a schematic structural diagram of three devices according to embodiments of the present disclosure.

An embodiment of the present disclosure further provides a second device, as shown in FIG. 15, the second device includes a second communication unit.

The second communication unit 1501 is configured to: receive a broadcast message or a multicast message from a first device in a network which the second device is located in, where the broadcast message or the multicast message includes a request for performing security domain discovery; and feed back a representation of a security domain resource to the first device, where the representation of the security domain resource includes security domain information, and the security domain information includes a security domain ID and a security domain name.

Figure 16:
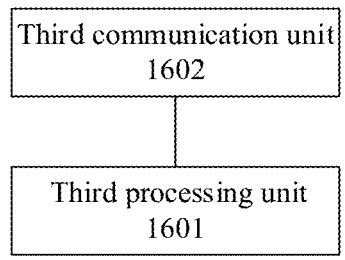
FIG. 16 is a schematic structural diagram of three devices according to embodiments of the present disclosure.

An embodiment of the present disclosure provides a third device, as shown in FIG. 16, the third device includes a third processing unit 1601 and a third communication unit 1602.

The third processing unit 1601 is configured to generate security domain information, where the security domain information includes at least a security domain ID and a security domain name.

The third communication unit 1602 is configured to configure security domain information for at least one second device included in a network which the third device is located in.

The first device or the third device described above may be a terminal device on which a client APP is installed, for example, a device such as a smartphone, a tablet computer, or the like. The second device may be any controlled device, or an IoT device, etc. in the Internet of Things or the home network. It should also be noted that the first device, the third device, and the second device are devices in the same network environment.

The solution according to the embodiment will now be described in conjunction with various examples.

In one example,
  the security domain information only includes a security domain ID and a security domain name. In other words, in the example, the discoverability of the security domain is not limited, or it is understood that all the second devices of Internet of Things in the same network are discoverable devices.

In at least one embodiment, the solution may include:
  the third processing unit 1601 of the third device generates security domain information after self-activation. In the example, the security domain information includes a security domain ID and a security domain name.

There are M second devices, which are also referred to as controllable devices, in the network which the third device is located in. The third communication unit 1602 of the third device activates and configures the M second devices (for example, controllable devices or IoT devices), where M is an integer greater than or equal to 1.

The third processing unit 1601 of the third device obtains the security domain information configured by itself from the representation of the security domain resource (resource "secDomain") The third communication unit 1602 of the third device configures the security domain information for the M second devices included in the network.

Correspondingly, the second communication unit 1501 of any one of the M second devices receives a third instruction from the third device in the network which the second device is located in. The third device is capable of configuring the security domain resource. The third instruction includes security domain information.

The second device further includes: a second processing unit 1502 that configures its own security domain information based on the received third instruction to obtain a representation of security domain resource.

The first device enters the network, and the first communication unit 1401 of the first device sends a broadcast or a multicast message to the M second devices in the network. M is an integer greater than or equal to 1. The broadcast message or the multicast message includes a request for performing security domain discovery.

The second communication unit 1501 of each of the M second devices receives a broadcast message or a multicast message from the first device in the network which the second device is located in, and feeds back the representation of the security domain resource to the first device.

The representation of the security domain resource includes security domain information, and the security domain information includes a security domain ID and a security domain name.

The first communication unit 1401 of the first device receives representations of the security domain resources (i.e., resource representations) fed back by the N second devices.

In the example, N=M.

The first processing unit 1402 of the first device obtains L pieces of security domain information based on the representations of the security domain resources fed back by the N second devices.

The first communication unit 1401 of the first device obtains endpoint information of the N second devices.

A specific manner of obtaining the endpoint information may include:
  a first communication unit 1401 of the first device sends a first instruction to the N second devices, and receives endpoint information fed back by the N second devices. The first instruction is used to obtain endpoint information of the second devices. Correspondingly, the second communication units 1501 of the second devices receive the first instruction from the first device, and feed back endpoint information to the first device. The first instruction is used to obtain endpoint information of the second devices.

Alternatively, the manner of obtaining the endpoint information may include:
  the first communication unit 1401 of the first device obtains endpoint information of the N second devices from the network side.

In the example, the endpoint information of each of the second devices includes at least one of:
  an IP address of the second device or a port number of the second device.

The first communication unit 1401 of the first device sends a second instruction to the N second devices according to the endpoint information of the N second devices, and receives the device information fed back by the N second devices. The second instruction is used to obtain device information of the second devices.

Correspondingly, the second communication units 1501 of the second devices receive a second instruction from the first device, and feed back device information to the first device.

Further, the device information may include at least device information such as a device type, an ID, and the like. Of course, more other content may be included, which is not exhaustive in the example.

The first processing unit 1402 of the first device displays security domain names included in the L pieces of security domain information corresponding to the L security domains and device information of at least one of the second devices corresponding to each of the security domains.

Based on the foregoing operations, the user may also view L security domain names and at least one device information corresponding to each of the security domain names through a display interface (such as a display screen). The user may then select a target security domain to be joined through the interaction interface of the first device, so that the first device joins the selected target security domain.

In still another example, different from the foregoing example, the security domain information in the example further includes security domain discoverability.

The security domain discoverability is used to indicate whether the security domain information corresponding to the second device can be discovered by other devices. In particular, the security domain discoverability may be a value of 1 bit. For example, when the security domain discoverability is set to a first value, it indicates that it is not discoverable, that is, the security domain discoverability is true; and when security domain discoverability is set to a second value, it indicates that it is discoverable, that is, the security domain discoverability is false. The first value may be 1 and the second value may be 0. Or, the first value is 0 and the second value is 1. Of course, it may also be set in other ways, which is not exhaustive in the example, as long as the security domain discoverability can be indicated as true or false.

In at least one embodiment, the solution may include:
the third processing unit generates security domain information after self-activation. In the example, the security domain information includes a security domain ID, a security domain name, and security domain discoverability.

The third device obtains the security domain information configured by itself from the representation of the security domain resource (resource "secDomain"), and the third communication unit of the third device configures the security domain information for the M second devices included in the network.

Correspondingly, the second communication unit of any one of the M second devices receives a third instruction from the third device in the network which the second device is located in. The third device is capable of configuring the security domain resource. The third instruction includes security domain information.

Then, the second processing unit of each of the M second devices configures its own security domain information based on the received third instruction to obtain a representation of the security domain resource.

Thus, the configurations for the security domain information of the M controllable devices or the M second devices included in the network which the third device is located in are completed.

The second communication unit of each of the M second devices receives a broadcast message or a multicast message from the first device in the network.

Then, the second processing unit of each of the second devices determines whether the security domain discoverability in the representation of the security domain resource saved by itself is true.

The second communication unit of the second device feeds back the representation of the security domain resource in response to that the security domain discoverability is true; otherwise, the representation of the security domain resource is not fed back.

The broadcast message or the multicast message includes a request for performing security domain discovery.

The first communication unit of the first device receives representations of the security domain resources fed back by the N second devices, of which security domain discoverability is true, in the M second devices.

In the example, N may be equal to M, or N may be less than M.

The first processing unit of the first device obtains L pieces of security domain information based on the representations of the security domain resources fed back by the N second devices. In the example, the first device obtains at least one piece of security domain information based on the representations of the security resources fed back by the N second devices. L may be 1. As such, the first device side may display L security domain names included in the current network.

The remaining processing is the same as the foregoing example, and is not described herein again.

In the last example, different from the foregoing examples, there may be two or more third devices in the example, each of the third devices may set its own security domain, and different third devices may set the same security domain or different security domains.

Accordingly, if the security domains of the third devices are different, for a third device, the corresponding security domain information (including the security domain ID, the security domain name, and the security domain discoverability) may be set for some of the M second devices to which the third device is connected.

After the first device accesses the network, the first device may obtain M security domain resources from the M second devices respectively, then determine and display the L security domains, and finally determine the security domains to be joined. In the example, L may be greater than or equal to 2.

In at least one embodiment, in the two or more third devices, the third processing unit of each of the third devices generates security domain information. Then, each of the third devices activates and configures M second devices through a respective third communication unit.

The third communication unit of each of the two or more third devices obtains security domain information configured by itself from the representation (resource "secDomain") of the security domain resource, and configures security domain information for one or more second devices included in the network.

Correspondingly, the second communication unit of any one of the M second devices receives a third instruction from one of the third devices in the network which the M second devices are located in.

The first processing unit of the first device obtains L pieces of security domain information based on the representations of the security domain resources fed back by the N second devices. In the example, the first device obtains at least one piece of security domain information based on the representations of the security resources fed back by the N second devices. L may be an integer greater than or equal to 2. As such, the first device side may display L security domain names included in the current network.

Other processes in the example are the same as those in the foregoing example, and are not described again.

As can be seen, according to the above solution, when the first device enters the network, the first device can discover, through a broadcast/multicast request, representations of security domain resources fed back by the plurality of second devices. Therefore, the first device can conveniently discover and obtain the security domain information existing in the network after entering the network, and thereby the client can present the discovered security domain to the user.

Figure 17:
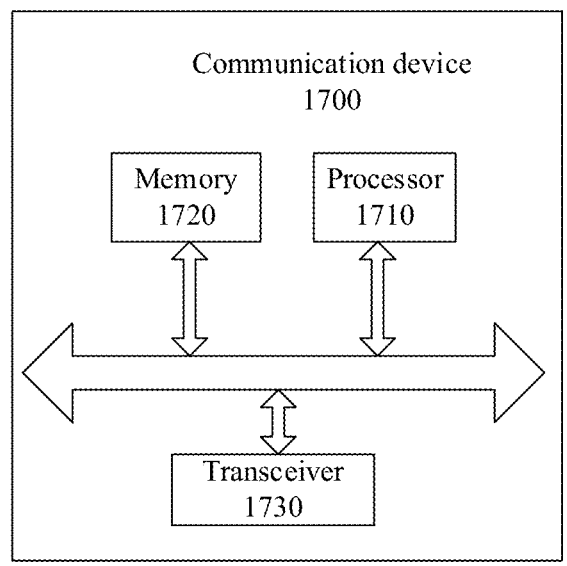
FIG. 17 is a schematic structural diagram of a communication device according to an embodiment of the present disclosure.

FIG. 17 is a schematic structural diagram of a communication device 1700 according to an embodiment of the present disclosure. In at least one embodiment, the communication device may be one of the first device, the second device, and the third device in the foregoing embodiments. The communication device 1700 shown in FIG. 17 includes a processor 1710 that may call and execute a computer program from a memory to implement the method in the embodiments of the present disclosure.

Alternatively, as shown in FIG. 17, the communication device 1700 may further include a memory 1720. The processor 1710 may call and run a computer program from the memory 1720 to implement the method in the embodiment of the present disclosure.

The memory 1720 may be a separate device independent of the processor 1710 or may be integrated into the processor 1710.

Alternatively, as shown in FIG. 17, the communication device 1700 may further include a transceiver 1730 that may be controlled by the processor 1710 to communicate with other devices, in particular sending information or data to other devices, or receiving information or data sent by other devices.

The transceiver 1730 may include a transmitter and a receiver. The transceiver 1730 may further include an antenna(s). The number of antenna(s) may be one or more.

Alternatively, the communication device 1700 may implement the corresponding operations implemented by the network device in each method of the embodiments of the present disclosure. For brevity, details are not described herein.

Figure 18:
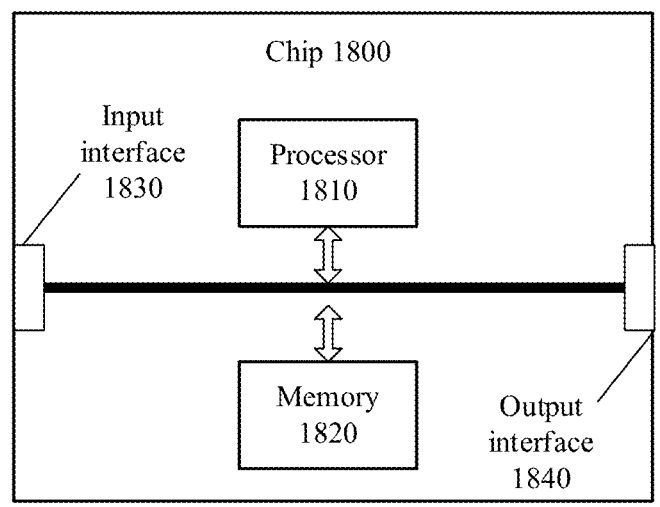
FIG. 18 is a schematic block diagram of a chip according to an embodiment of the present disclosure.

FIG. 18 is a schematic structural diagram of a chip according to an embodiment of the present disclosure. The chip 1800 shown in FIG. 18 includes a processor 1810 that may call and execute a computer program from a memory to implement the method of the embodiments of the present disclosure.

Alternatively, as shown in FIG. 18, the chip 1800 may further include a memory 1820. The processor 1810 may call and execute a computer program from the memory 1820 to implement the method of the embodiments of the present disclosure.

The memory 1820 may be a separate device independent of the processor 1810 or may be integrated into the processor 1810.

Alternatively, the chip 1800 may further include an input interface 1830. The processor 1810 may control the input interface 1830 to communicate with other devices or chips. In at least one embodiment, the processor 1810 may obtain information or data transmitted by other devices or chips.

Alternatively, the chip 1800 may further include an output interface 1840. The processor 1810 may control the output interface 1840 to communicate with other devices or chips. In at least one embodiment, the processor 1810 may output information or data to other devices or chips.

Alternatively, the chip may be applied to one of the first device, the second device, and the third device in the embodiments of the present disclosure, and the chip may implement the corresponding operations implemented by the terminal device in each method in the embodiments of the present disclosure. For brevity, details are not described herein.

It should be understood that the chip mentioned in the embodiments of the present disclosure may also be referred to as a system-level chip, a system chip, a chip system, or a system-on-chip.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a programmable ROM (PROM), an Erasable PROM (EPROM), an Electrically EPROM (EEPROM) or a flash memory. The volatile memory may be a random access memory (RAM), and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

An embodiment of the disclosure further provides a computer-readable storage medium, which is configured to store a computer program.

Alternatively, the computer-readable storage medium may be applied to the network device or the terminal device in the embodiments of the disclosure, and the computer program enables a computer to execute corresponding operations implemented by the network device in each method of the embodiments of the disclosure. For simplicity, elaborations are omitted herein.

An embodiment of the disclosure further provides a computer program product, which includes computer program instructions.

Alternatively, the computer program product may be applied to the network device or the terminal device in the embodiments of the disclosure, and the computer program instruction enables a computer to execute corresponding operations implemented by the network device in each method of the embodiments of the disclosure. For simplicity, elaborations are omitted herein.

An embodiment of the disclosure further provides a computer program.

Alternatively, the computer program may be applied to the network device or the terminal device in the embodiments of the disclosure, and the computer program runs in a computer to enable the computer to execute corresponding operations implemented by the network device in each method of the embodiments of the disclosure. For simplicity, elaborations are omitted herein.

In order to solve the above technical problem, the embodiments of the present disclosure provide a method for discovering security information, a method and device for configuring security information, a chip, a computer-readable storage medium, a computer program product, and a computer program.

According to a first aspect, a method for discovering security information is provided. The method includes the following operations.

The first device sends a broadcast message or a multicast message to M second devices in a network which the first device is located in, where M is an integer greater than or equal to 1, and the broadcast message or the multicast message includes a request for performing security domain discovery.

The first device receives representations of security domain resources fed back by N second devices, where N is an integer greater than or equal to 1 and less than or equal to M.

The first device obtains L pieces of security domain information based on the representations of the security domain resources fed back by the N second devices, and displays the L pieces of security domain information, where L is an integer greater than or equal to 1, and each piece of the security domain information includes a security domain identifier (ID) and a security domain name.

According to a second aspect, a method for discovering security information is provided. The method includes the following operations.

The second device receives a broadcast message or a multicast message from a first device in a network which the second device is located in, where the broadcast message or the multicast message includes a request for performing security domain discovery.

The second device feeds back a representation of a security domain resource to the first device, where the representation of the security domain resource includes security domain information, and the security domain information includes a security domain ID and a security domain name.

According to a third aspect, a method for configuring security information is provided. The method includes the following operations.

A third device generates security domain information, where the security domain information includes at least a security domain ID and a security domain name.

The third device configures security domain information for at least one second device included in a network which the third device is located in.

According to a fourth aspect, a first device is provided. The first device includes a first communication unit and a first processing unit.

The first communication unit is configured to: send a broadcast message or a multicast message to M second devices in a network which the first device is located in, where M is an integer greater than or equal to 1, and the broadcast message or the multicast message includes a request for performing security domain discovery; and receive representations of security domain resources fed back by N second devices, where N is an integer greater than or equal to 1 and less than or equal to M.

The first processing unit is configured to obtain L pieces of security domain information based on the representations of the security domain resources fed back by the N second devices, and display the L pieces of security domain information, where L is an integer greater than or equal to 1, and each piece of the security domain information includes a security domain ID and a security domain name.

According to a fifth aspect, a second device is provided. The second device includes a second communication unit.

The second communication unit is configured to: receive a broadcast message or a multicast message from a first device in a network which the second device is located in, where the broadcast message or the multicast message includes a request for performing security domain discovery; and feed back a representation of a security domain resource to the first device, where the representation of the security domain resource includes security domain information, and the security domain information includes a security domain ID and a security domain name.

According to a sixth aspect, a third device is provided. The third device includes a third processing unit and a third communication unit.

The third processing unit is configured to generate security domain information, where the security domain information includes at least a security domain ID and a security domain name.

The third communication unit is configured to configure security domain information for at least one second device included in a network which the third device is located in.

According to a seventh aspect, a device is provided. The device includes a processor, and a memory configured to store a computer program executable by the processor.

The processor is configured to call and execute the computer program stored in the memory to perform the operations of the method described above.

According to an eighth aspect, a chip is provided. The chip includes a processor configured to call and execute a computer program from a memory, to cause a device installed with the chip to perform the method described above.

According to a ninth aspect, there is provided a computer-readable storage medium for storing a computer program, which causes a computer to perform the operations of the method described above.

According to a tenth aspect, there is provided a computer program product including computer program instructions, which cause a computer to perform the method described above.

According to an eleventh aspect, there is provided a computer program causing a computer to perform the method described above.

According to the above solution, when the first device enters the network, the first device can discover, through a broadcast/multicast request, representations of security domain resources fed back by the plurality of second devices. Therefore, the first device can conveniently discover and obtain the security domain information existing in the network after entering the network. Accordingly, the client can present the discovered security domain to the user, thereby ensuring the efficiency of the first device joining the network and discovering the security domain.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that regarding specific operating processes of the system, device and unit described above, reference may be made to the corresponding processes in the method embodiment. The operating processes are not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, coupling or direct coupling or communication connection between displayed or discussed components may be indirect coupling or communication connection implemented through some interfaces, the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, all functional units in each embodiment of the disclosure may be integrated into a processing unit, or each functional unit may also physically exist independently, and two or more than two functional units may also be integrated into a unit.

The forgoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for discovering security information, comprising:
   obtaining, by a second device, a representation of a security domain resource according to security domain information configured by a master controlling device; wherein the second device is a controlled device in a network in which the master controlling device is located, and the master controlling device is configured to configure and control all controlled devices in the network;
   receiving, by the second device, a broadcast message or a multicast message from a first device, wherein the first device is a device newly entered in the network to discover the security domain information corresponding to the second device, and the broadcast message or the multicast message comprises a request for performing security domain discovery;
   determining, by the second device, a value of security domain discoverability in the representation of the security domain resource stored in the second device, wherein the value of security domain discoverability is configured by the master controlling device and used to indicate whether the security domain information corresponding to the second device can be discovered by other devices; and
   in response to that the value of security domain discoverability is a first value, determining, by the second device, that the security domain discoverability is true, and feeding back, by the second device, the representation of the security domain resource; and
   in response to that the value of security domain discoverability is a second value, determining, by the second device, that the security domain discoverability is false, and not feeding back, by the second device, the representation of the security domain resource; wherein the first value is different from the second value;
   wherein the representation of the security domain resource comprises the security domain information, and the security domain information comprises a security domain identifier (ID) and a security domain name.

2. The method of claim 1, further comprising:
   receiving, by the second device, a third instruction from the master controlling device in the network, wherein the master controlling device is capable of configuring the security domain resource, and the third instruction comprises the security domain information.

3. The method of claim 1, wherein the security domain information further comprises:
   security domain discoverability.

4. The method of claim 1, further comprising:
   receiving, by the second device, a first instruction from the first device, and
   feeding back, by the second device, endpoint information to the first device,
   wherein the first instruction is used to obtain endpoint information of the second device.

5. The method of claim 4, wherein the endpoint information comprises at least one of:
   an Internet Protocol (IP) address of the second device or a port number of the second device.

6. The method of claim 4, wherein the method further comprises:
- receiving, by the second device, a second instruction from the first device, and
- feeding back, by the second device, device information to the first device,
- wherein the second instruction is used to obtain device information of the second device.

7. A second device, comprising:
- a processor, configured to obtain a representation of a security domain resource according to security domain information configured by a master controlling device; wherein the second device is a controlled device in a network in which the master controlling device is located, and the master controlling device is configured to configure and control all controlled devices in the network; and
- a transceiver, configured to: receive a broadcast message or a multicast message from a first device, wherein the first device is a device newly entered in the network to discover the security domain information corresponding to the second device, and the broadcast message or the multicast message comprises a request for performing security domain discovery;
- wherein the processor is further configured to determine a value of security domain discoverability in the representation of a security domain resource stored in the second device, wherein the value of security domain discoverability is configured by the master controlling device and used to indicate whether the security domain information corresponding to the second device can be discovered by other devices;
- wherein the transceiver is further configured to: in response to that the value of security domain discoverability is a first value, determine that the security domain discoverability is true, and feed back the representation of the security domain resource to the first device; and in response to that the value of security domain discoverability is a second value, determine that the security domain discoverability is false, and not feed back the representation of the security domain resource; wherein the first value is different from the second value; and
- wherein the representation of the security domain resource comprises the security domain information, and the security domain information comprises a security domain identifier (ID) and a security domain name.

8. The second device of claim 7, wherein the transceiver is configured to receive a third instruction from the master controlling device in the network, wherein the master controlling device is capable of configuring the security domain resource, and the third instruction comprises the security domain information.

9. The second device of claim 7, wherein the security domain information further comprises:
- security domain discoverability.

10. The second device of claim 7, wherein the transceiver is configured to receive a first instruction from the first device, and feed back endpoint information to the first device, wherein the first instruction is used to obtain endpoint information of the second device.

11. The second device of claim 10, wherein the endpoint information comprises at least one of:
- an Internet Protocol (IP) address of the second device or a port number of the second device.

12. The second device of claim 10, wherein the transceiver is configured to receive a second instruction from the first device, and feed back device information to the first device, wherein the second instruction is used to obtain device information of the second device.

13. The second device of claim 12, wherein the device information comprises a device type and an ID of the second device.

* * * * *